United States Patent
Finn et al.

(10) Patent No.: US 8,466,931 B2
(45) Date of Patent: *Jun. 18, 2013

(54) COLOR MODIFICATION OF OBJECTS IN A VIRTUAL UNIVERSE

(75) Inventors: Peter George Finn, Brampton (CA); Rick Allen Hamilton, II, Charlottesville, VA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 995 days.

This patent is subject to a terminal disclaimer.

(21) Appl. No.: 12/109,040

(22) Filed: Apr. 24, 2008

(65) Prior Publication Data

US 2009/0267960 A1    Oct. 29, 2009

(51) Int. Cl.
*G09G 5/02*    (2006.01)
(52) U.S. Cl.
USPC .......................................... 345/593; 345/589
(58) Field of Classification Search
USPC .................................. 345/593, 589
See application file for complete search history.

(56) References Cited

U.S. PATENT DOCUMENTS

| | | | |
|---|---|---|---|
| 6,023,270 A | 2/2000 | Brush, II et al. | |
| 6,036,601 A | 3/2000 | Heckel | |
| 6,349,301 B1 | 2/2002 | Mitchell et al. | |
| 6,394,301 B1 | 5/2002 | Koch | |
| 6,421,047 B1 | 7/2002 | de Groot | |
| 6,532,007 B1 | 3/2003 | Matsuda | |
| 6,570,563 B1 | 5/2003 | Honda | |
| 6,580,811 B2 | 6/2003 | Maurer et al. | |
| 6,749,510 B2 | 6/2004 | Giobbi | |
| 6,788,946 B2 | 9/2004 | Winchell et al. | |
| 6,798,407 B1 * | 9/2004 | Benman ........................ | 345/419 |
| 6,868,389 B1 | 3/2005 | Wilkins et al. | |
| 6,895,406 B2 | 5/2005 | Fables et al. | |
| 6,954,728 B1 | 10/2005 | Kusumoto et al. | |
| 6,981,220 B2 | 12/2005 | Matsuda | |
| 7,025,675 B2 | 4/2006 | Fogel et al. | |
| 7,158,135 B2 | 1/2007 | Santodomingo et al. | |
| 7,305,691 B2 | 12/2007 | Cristofalo | |
| 7,320,031 B2 | 1/2008 | Konig et al. | |

(Continued)

OTHER PUBLICATIONS

Kiss et al. "Viewpoint Adaptation during Navigation based on Stimuli from the Virtual Environment" Web3D 03' Proceedings of the eighth international conference on 3D Web technology, ACM, New York, NY, 2003, p. 23.*

(Continued)

*Primary Examiner* — Maurice L McDowell, Jr.
(74) *Attorney, Agent, or Firm* — Yee & Associates, P.C.; Arthur Samodovitz

(57) ABSTRACT

A computer implemented method, apparatus, and computer program product for modifying an object. In one embodiment, the process obtains avatar tracking data that identifies a location of an avatar in relation to a range of an object. The range includes a viewable field. The process then calculates modified pixel color values to form a modified color in response to detecting a condition for triggering modification of the object. Thereafter, the process modifies a color of the object to form the modified color when the location of the set of avatars is within the range of the object.

12 Claims, 12 Drawing Sheets

U.S. PATENT DOCUMENTS

| | | | |
|---|---|---|---|
| 7,454,065 B2 | 11/2008 | Satoh | |
| 7,479,967 B2 | 1/2009 | Bachelder et al. | |
| 7,542,040 B2 | 6/2009 | Templeman | |
| 7,685,204 B2 | 3/2010 | Rogers | |
| 7,720,835 B2 | 5/2010 | Ward et al. | |
| 7,805,680 B2* | 9/2010 | Meyers et al. | 715/744 |
| 7,822,687 B2 | 10/2010 | Brillon et al. | |
| 8,001,161 B2 | 8/2011 | Finn et al. | |
| 8,184,116 B2 | 5/2012 | Finn et al. | |
| 8,203,503 B2 | 6/2012 | Castellar et al. | |
| 8,212,809 B2 | 7/2012 | Finn et al. | |
| 8,233,005 B2 | 7/2012 | Finn et al. | |
| 8,259,100 B2 | 9/2012 | Finn et al. | |
| 2001/0033675 A1 | 10/2001 | Maurer et al. | |
| 2002/0024532 A1 | 2/2002 | Fables et al. | |
| 2002/0056091 A1 | 5/2002 | Bala et al. | |
| 2002/0107072 A1 | 8/2002 | Giobbi | |
| 2002/0113809 A1 | 8/2002 | Akazawa et al. | |
| 2002/0138607 A1 | 9/2002 | O'Rourke et al. | |
| 2002/0169644 A1 | 11/2002 | Greene | |
| 2003/0004774 A1 | 1/2003 | Greene et al. | |
| 2003/0091229 A1 | 5/2003 | Edge et al. | |
| 2004/0034561 A1 | 2/2004 | Smith | |
| 2004/0053690 A1 | 3/2004 | Fogel et al. | |
| 2004/0166935 A1 | 8/2004 | Gavin et al. | |
| 2004/0210634 A1 | 10/2004 | Ferrer et al. | |
| 2004/0220850 A1 | 11/2004 | Ferrer et al. | |
| 2005/0071306 A1 | 3/2005 | Kruszewski et al. | |
| 2005/0086112 A1 | 4/2005 | Shkedi | |
| 2005/0086605 A1 | 4/2005 | Ferrer et al. | |
| 2005/0114198 A1 | 5/2005 | Koningstein et al. | |
| 2005/0125229 A1 | 6/2005 | Kurzweil | |
| 2005/0151728 A1 | 7/2005 | Nenonen | |
| 2005/0156928 A1 | 7/2005 | Santodomingo et al. | |
| 2005/0179685 A1 | 8/2005 | Kake et al. | |
| 2005/0253872 A1 | 11/2005 | Goss et al. | |
| 2005/0286769 A1* | 12/2005 | Satoh | 382/190 |
| 2006/0130095 A1 | 6/2006 | Willis et al. | |
| 2006/0168143 A1 | 7/2006 | Moetteli | |
| 2006/0194632 A1 | 8/2006 | Hendrickson et al. | |
| 2006/0195462 A1 | 8/2006 | Rogers | |
| 2006/0258462 A1 | 11/2006 | Cheng et al. | |
| 2007/0003915 A1 | 1/2007 | Templeman | |
| 2007/0035561 A1* | 2/2007 | Bachelder et al. | 345/633 |
| 2007/0043616 A1 | 2/2007 | Kutaragi et al. | |
| 2007/0100650 A1 | 5/2007 | Ramer et al. | |
| 2007/0191104 A1 | 8/2007 | Van Luchene | |
| 2007/0236516 A1 | 10/2007 | Castellar et al. | |
| 2007/0247979 A1 | 10/2007 | Brillon et al. | |
| 2007/0252841 A1 | 11/2007 | Kim | |
| 2007/0261109 A1 | 11/2007 | Renaud et al. | |
| 2008/0004119 A1 | 1/2008 | Van Luchene et al. | |
| 2008/0252716 A1* | 10/2008 | Kano et al. | 348/14.01 |
| 2008/0281622 A1 | 11/2008 | Hoal | |
| 2009/0063168 A1 | 3/2009 | Finn et al. | |
| 2009/0089157 A1* | 4/2009 | Narayanan | 705/14 |
| 2009/0227368 A1 | 9/2009 | Wyatt | |
| 2009/0254417 A1 | 10/2009 | Beilby et al. | |
| 2009/0267937 A1 | 10/2009 | Finn et al. | |
| 2009/0267948 A1 | 10/2009 | Finn et al. | |
| 2009/0267950 A1 | 10/2009 | Finn et al. | |
| 2009/0271422 A1 | 10/2009 | Finn et al. | |
| 2009/0299960 A1 | 12/2009 | Lineberger et al. | |
| 2009/0327219 A1 | 12/2009 | Finn et al. | |
| 2010/0001993 A1 | 1/2010 | Finn et al. | |
| 2010/0005423 A1 | 1/2010 | Finn et al. | |
| 2010/0177117 A1 | 7/2010 | Finn et al. | |
| 2010/0205179 A1 | 8/2010 | Carson et al. | |
| 2012/0266088 A1 | 10/2012 | Finn et al. | |

OTHER PUBLICATIONS

U.S. Appl. No. 12/108,925, filed Apr. 24, 2008, Finn et al.
U.S. Appl. No. 12/108,968, filed Apr. 24, 2008, Finn et al.
U.S. Appl. No. 12/108,987, filed Apr. 24, 2008, Finn et al.
U.S. Appl. No. 12/109,010, filed Apr. 24, 2008, Finn et al.
U.S. Appl. No. 12/165,922, filed Jul. 1, 2008, Finn et al.
U.S. Appl. No. 12/109,023, filed Apr. 24, 2008, Finn et al.
U.S. Appl. No. 12/168,657, filed Jul. 7, 2008, Finn et al.
U.S. Appl. No. 11/846,724, filed Aug. 29, 2007, Finn et al.
USPTO office action for U.S. Appl. No. 12/109,023 dated Dec. 1, 2010.
USPTO office action for U.S. Appl. No. 12/168,657 dated Apr. 26, 2011.
USPTO notice of allowance for U.S. Appl. No. 12/109,023 dated Apr. 13, 2011.
Avatar-Based Marketing: The Avatar-Based Panel (Part One of Five), New World Notes, http://nwn.blogs.com/nwn/2006/06/avatarbased_mar.html, accessed Nov. 10, 2011, 15 pages.
Avatar-Based Marketing: The Avatar-Based Panel (Part Two of Five), New World Notes, http://nwn.blogs.com/nwn/2006/06/avatarbased_mar.html, accessed Nov. 10, 2011, 6 pages.
Avatar-Based Marketing: The Avatar-Based Panel (Part Three of Five), New World Notes, http://nwn.blogs.com/nwn/2006/06/avatarbased_mar.html, accessed Nov. 10, 2011, 6 pages.
Avatar-Based Marketing: The Avatar-Based Panel (Part Four of Five), New World Notes, http://nwn.blogs.com/nwn/2006/06/avatarbased_mar.html, accessed Nov. 10, 2011, 6 pages.
Avatar-Based Marketing: The Avatar-Based Panel (Part One of Five), New World Notes, http://nwn.blogs.com/nwn/2006/06/avatarbased_mar.html, accessed Nov. 10, 2011, 6 pages.
Hughes, "Those custom Reeboks and the next party," Eightbar, http://eightbar.co.uk/2006/10/11/those-custom-reeboks-and-the-next-party, accessed Oct. 11, 2006, 5 pages.
Hughes, "Planes, trains and automobiles, here come Nissan," Eightbar, http://eightbar.co.uk/2006/10/24/planes-trains-and-automobiles-here-come-nissan, Oct. 24, 2006, 3 pages.
Hughes, "The Sony BMG media island, it is very good," Eightbar, http://eightbar.co.uk/2006/10/19/the-sony-bmg-media-island-it-is-very-good, Oct. 19, 2006, 8 pages.
Hughes, "Ben Folds in Second Life the Event," Eightbar, http://eightbar.co.uk/2006/10/20/ben-folds-in-second-life-the-event, Oct. 20, 2006, 3 pages.
Reynolds, "Virtual Worlds introduction presentation," Eightbar, http://eightbar.co.uk/2006/08/17/virtual-worlds-introduction-presentation, Aug. 17, 2006, 8 pages.
"Life2Life—ECS-Powered Amazon Store Within Second Life," Amazon Web Services Blog, http://aws.typepad.com/aws/2006/07/lifetolife_ecspo.html, accessed Nov. 10, 2011, 7 pages.
"Trap," NWN Wikia, http://web.archive.org/web/20071112084836/http://nwm.wikia.com/wiki/Trap, accessed Sep. 14, 2011, 3 pages.
"Unseen," WOW Wiki, http://web.archive.org/web/20070207113119/http://www.wowwiki.com/Unseen, accessed Sep. 14, 2011, 2 pages.
USPTO Office Action regarding U.S. Appl. No. 11/846,724, dated Oct. 27, 2010.
USPTO Final Office Action regarding U.S. Appl. No. 11/846,724, dated Feb. 4, 2011.
USPTO Office Action regarding U.S. Appl. No. 12/108,925, dated Sep. 9, 2011.
USPTO Office Action regarding U.S. Appl. No. 12/108,968, dated Oct. 28, 2011.
USPTO Supplemental Notice of Allowance regarding U.S. Appl. No. 12/109,023, dated May 13, 2011.
USPTO Office Action regarding U.S. Appl. No. 12/165,922, dated Nov. 10, 2011.
USPTO Final Office Action regarding U.S. Appl. No. 12/168,657, dated Oct. 4, 2011.
Office Action, dated Dec. 20, 2012, regarding U.S. Appl. No. 11/846,724, 12 pages.
Notice of Allowance, dated Dec. 13, 2012, regarding U.S. Appl. No. 12/168,657, 12 pages.
Office Action, dated Oct. 4, 2012, regarding U.S. Appl. No. 13/531,265, 46 pages.
Gladestrider, "ZAM Everquest Classes: The Ranger—Tracking-Help," http://everquest.allakhazam.com/db/classes.html?=10&mid=1098807428716491276, dated Oct. 26, 2004, 2 pages.
Riddikulus, "Dungeons and Dragons Online Eberron Unlimited Forums: Repeating quests—limit?" http://forums.ddo.com/showthread.php?t=123676, dated Oct. 8, 2007, 6 pages.

USPTO Notice of Allowance regarding U.S. Appl. No. 12/108,925, dated Dec. 29, 2011, 18 pages.
USPTO Office Action regarding U.S. Appl. No. 12/108,987, dated Dec. 1, 2011, 39 pages.
USPTO Office Action regarding U.S. Appl. No. 12/109,010, dated Jan. 30, 2012, 43 pages.
USPTO Final Office Action regarding U.S. Appl. No. 12/353,656, dated Dec. 23, 2011, 47 pages.
Notice of Allowance, dated Feb. 21, 2012, regarding U.S. Appl. No. 12/108,968, 21 pages.
Notice of Allowance, dated Mar. 16, 2012, regarding U.S. Appl. No. 12/108,987, 21 pages.
Finn et al., "Contextual Templates for Modifying Objects in a Virtual Universe," U.S. Appl. No. 13/531,265, filed Jun. 22, 2012, 48 pages.
Notice of Allowance regarding U.S. Appl. No. 12/109,010, dated Apr. 11, 2012, 15 pages.
Final Office Action regarding U.S. Appl. No. 12/165,922, dated Jun. 21, 2012, 30 pages.
Office Action regarding U.S. Appl. No. 12/168,657, dated Jun. 22, 2012, 45 pages.
USPTO Office Action dated Aug. 24, 2011 for U.S. Appl. No. 12/353,656.
Notice of Allowance, dated Feb. 4, 2013, regarding USPTO U.S. Appl. No. 13/531,265, 12 pages.
Notice of Allowance, dated Feb. 22, 2013, regarding USPTO U.S. Appl. No. 12/168,657, 13 pages.

* cited by examiner

OBJECT AVATAR
RENDERING (OAR) TABLE
500

502 — RenderingUUID = PRIMARY KEY.

504 — ObjectUUID = FOREIGN KEY TO EXISTING OBJECT TABLE.

506 — AvatarUUID = FOREIGN KEY TO EXISTING AVATAR TABLE.

508 — Zone1EnterTime = UTC DATETIME WHEN AVATAR'S SESSION STARTED (WHEN THEY ENTERED THE FIRST ZONE, ASSUMING A TWO ZONE MODEL).

510 — Zone1LeaveTime = UTC DATETIME WHEN AVATAR LEFT THE FIRST ZONE.

512 — Zone2EnterTime = UTC DATETIME WHEN AVATAR'S SESSION STARTED (WHEN THEY ENTERED THE SECOND ZONE, ASSUMING A TWO THRESHOLD MODEL).

514 — Zone2LeaveTime = UTC DATETIME WHEN AVATAR LEFT THE SECOND ZONE.

516 — NumberOfZone1Enters = NUMERIC COUNTER OF HOW MANY TIMES AVATAR HAS ENTERED THE FIRST ZONE.

518 — NumberOfZone2Enters = NUMERIC COUNTER OF HOW MANY TIMES AVATAR HAS ENTERED THE SECOND ZONE.

520 — LastCoordinates = COORDINATE DATA OF WHERE THE AVATAR IS WITHIN THE ZONES (TYPICALLY AN XYZ SYSTEM).

*FIG. 5*

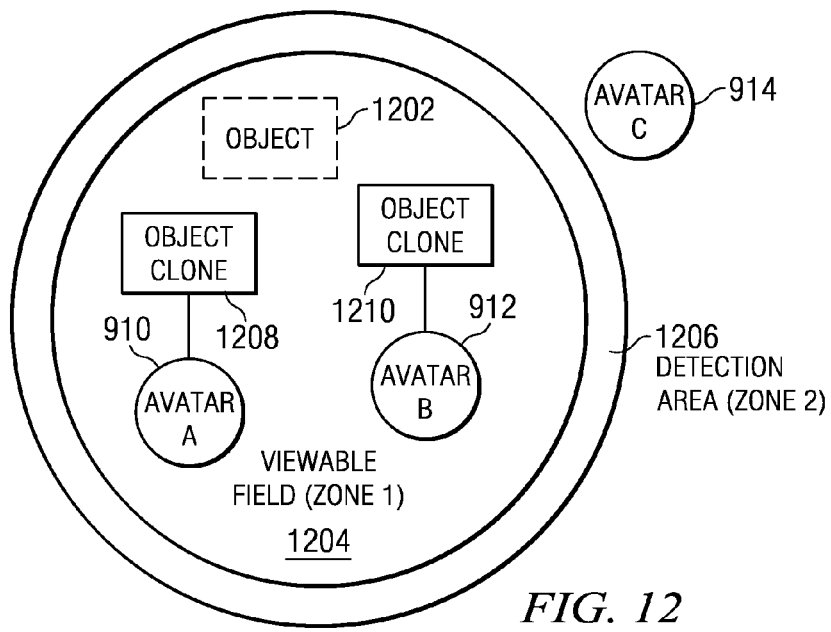

FIG. 12

| RENDERING UUID = PRIMARY KEY ||
|---|---|
| OBJECT A UUID | AVATAR A UUID |
| | AVATAR A ZONE 1 ENTER TIME |
| | AVATAR A ZONE 2 ENTER TIME |
| | AVATAR A ZONE 1 LEAVE TIME |
| | AVATAR A ZONE 2 LEAVE TIME |
| OBJECT B UUID | AVATAR A UUID |
| | AVATAR A ZONE 1 ENTER TIME |
| | AVATAR A ZONE 2 ENTER TIME |
| | AVATAR A ZONE 1 LEAVE TIME |
| | AVATAR A ZONE 2 LEAVE TIME |
| | AVATAR C UUID |
| | AVATAR C ZONE 1 ENTER TIME |
| | AVATAR C ZONE 2 ENTER TIME |
| | AVATAR C ZONE 1 LEAVE TIME |
| | AVATAR C ZONE 2 LEAVE TIME |

OBJECT BASED AVATAR TABLE 1300

FIG. 13

COLOR MODIFICATION OF OBJECTS IN A VIRTUAL UNIVERSE

BACKGROUND OF THE INVENTION

1. Field of the Invention

The present invention is related generally to a data processing system and in particular to a method and apparatus for managing objects in a virtual universe. More particularly, the present invention is directed to a computer implemented method, apparatus, and computer usable program code for modifying an object's virtual universe color elements for presentation to a set of avatars.

2. Description of the Related Art

A virtual universe (VU), also referred to as a metaverse or "3D Internet", is a computer-based simulated environment. Examples of virtual universes include Second Life®, Entropia Universe, The Sims Online®, There.com, and Red Light Center. Other examples of virtual universes include multi-player online games, such as EverQuest®, Ultima Online®, Lineage®, and World of Warcraft® (WoW).

Many virtual universes are represented using three dimensional (3-D) graphics and landscapes. The properties and elements of the virtual universe often resemble the properties of the real world, such as in terms of physics, houses, and landscapes. Virtual universes may be populated by thousands of users simultaneously. In a virtual universe, users are sometimes referred to as "residents."

The users in a virtual universe can interact, inhabit, and traverse the virtual universe through the use of avatars. An avatar is a graphical representation of a user that other users in the virtual universe can see and interact with. The avatar's appearance is typically selected by the user and often takes the form of a cartoon-like representation of a human. However, avatars may also have non-human appearances, such as animals, elves, trolls, orcs, fairies, and other fantasy creatures.

The viewable field is the field of view for a particular user. The viewable field for a particular user may include objects, as well as avatars belonging to other users. The viewable field is determined by the virtual universe grid software according to the geometries and textures that are currently loaded in a user's virtual universe client. The virtual universe grid determines the length of time that a user views an object based on processing the data sent to each virtual universe client.

Objects are prevalent in virtual universes. An object is an element in a virtual universe that does not represent a user. An object may be, for example, buildings, statues, billboards, signs, and advertisements in the virtual universe. However, objects in a particular user's viewable field may be difficult or impossible to view because of the manner in which the object is presented to a user. For example, the color of objects may be modified by methods that may decrease the visibility of the object. Thus, a method for presenting ambient lighting conditions may obscure the object. In addition, objects may be obstructed by other objects in the virtual universe. Further, inventory items worn by an avatar may modify the color of an object, thereby rendering it difficult to see.

BRIEF SUMMARY OF THE INVENTION

The illustrative embodiments provide a method, computer program product, and computer system for modifying an object located in a virtual universe. Tracking data is obtained that identifies a location of a set of avatars in relation to a range of the object located in the virtual universe. The range includes a first zone in which the set of avatars is able to see the object and a second zone outside of the first zone in which the set of avatars is not able to see the object. The first zone has a first radial distance from a location of the object and the second zone has a second radial distance from the location of the object. In response to the set of avatars being within the second zone, a clone of the object located in the virtual universe is generated for each avatar in the set of avatars. In response to detecting a condition for triggering a modification of a color of the clone of the object, modified pixel color values are calculated when the set of avatars is in the second zone to form a modified color. The color of the clone of the object is brightened to increase visibility of the clone of the object to the modified color when the location of an avatar in the set of avatars is within the first zone. The color of a particular clone of the object associated with a particular avatar in the set of avatars is modified according to conditions in the virtual universe associated with the particular avatar. The modified color is applied to the clone of the object for a predetermined amount of time.

BRIEF DESCRIPTION OF THE SEVERAL VIEWS OF THE DRAWINGS

FIG. 5 is a block diagram of an object avatar rendering table in accordance with an illustrative embodiment;

FIG. 12 is a block diagram of a set of clones presented to a set of avatars in accordance with an illustrative embodiment;

FIG. 13 is a block diagram of an object based avatar table for a plurality of objects in accordance with an illustrative embodiment;

DETAILED DESCRIPTION OF THE PREFERRED EMBODIMENT

Figure 1:
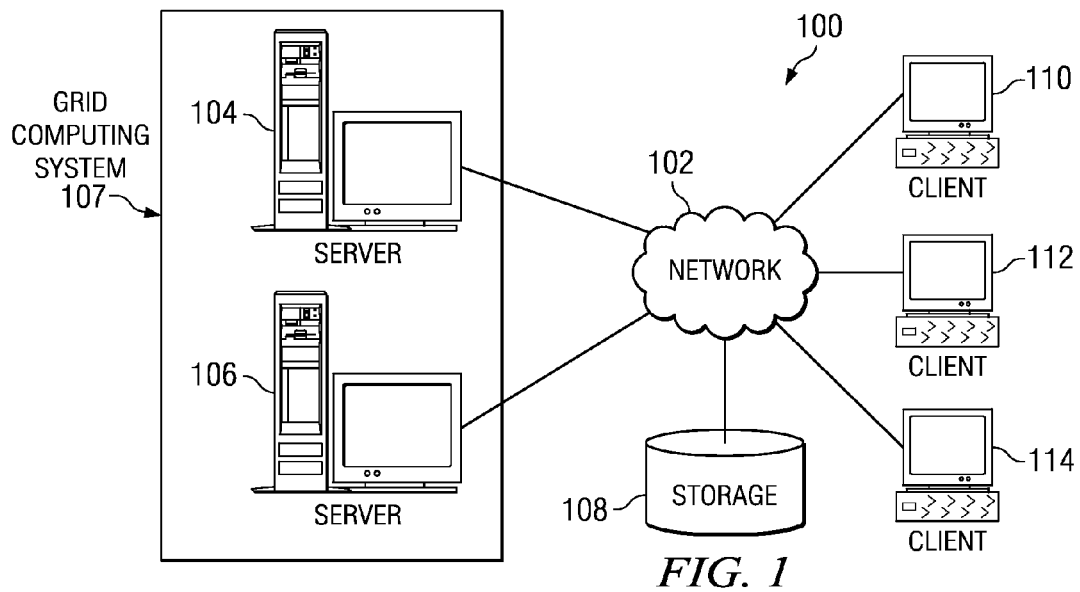
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
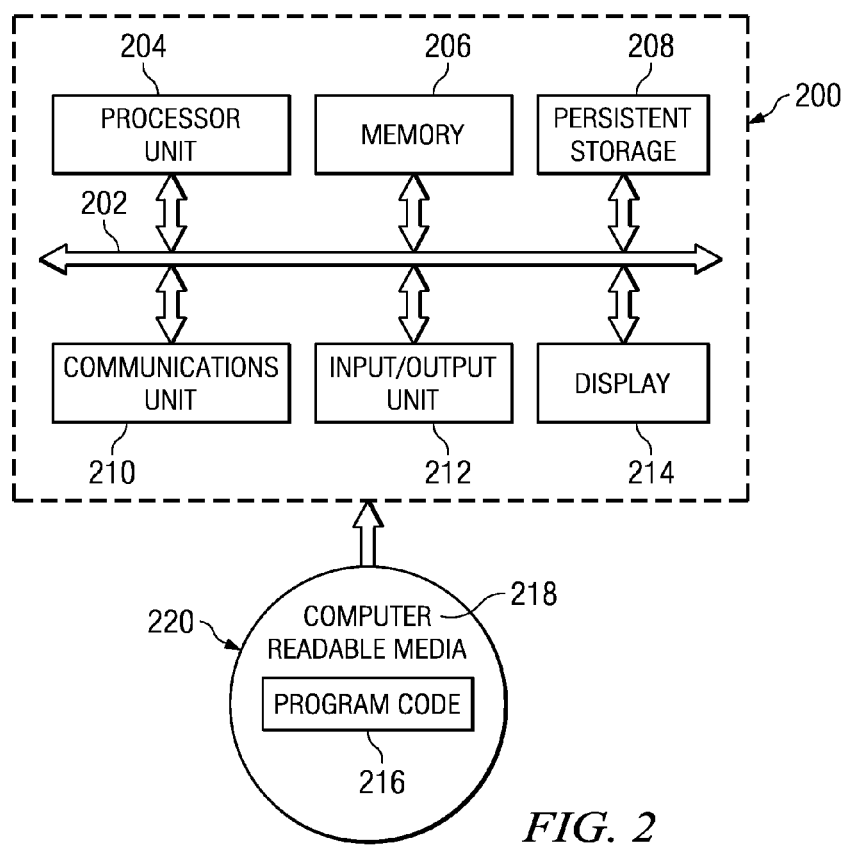
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Servers 104 and 106 are servers associated with a virtual universe. In particular, servers 104 and 106 form grid computing system 107. Grid computing system 107 is a system formed from two or more data processing systems for rendering and managing a virtual universe. Users of the virtual universe have agents on servers 104 and 106. An agent is a user's account. A user uses an agent to build an avatar representing the user. The agent is tied to the inventory of assets or possessions the user owns in the virtual universe.

Clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. A server, such as server 104 may store a region of a virtual universe. A region is a virtual area of land within the virtual universe. In a virtual universe, assets, avatars, the environment, and anything visual consists of universally unique identifiers (UUIDs) tied to geometric data, textures, and effects data. Geometric data is distributed to a user's client computer, such as client 110, as textual coordinates. Textures are distributed to a user's client computer as graphics files, such as Joint Photographic Experts Group (JPEG) files. Effects data is typically rendered by the user's client according to the user's preferences and the user's client device capabilities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments. Network data processing system 100 may include additional servers, clients, and other devices not shown.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

A virtual universe is a computer-simulated environment, such as, without limitation, Second Life®, Entropia Universe, The Sims Online®, There.com, Red Light Center, EverQuest®, Ultima Online®, Lineage®, and World of Warcraft®. A virtual universe is typically represented using three-dimensional (3-D) graphics to represent various objects, such as landscapes, the sky, animals, vehicles, buildings, and other graphical objects.

The users in the virtual universe interact, inhabit, and traverse the virtual universe using avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client.

The visibility of an object may be compromised by obstructions from objects in the virtual universe. Objects such as trees, buildings, or landscape may obstruct an avatar's view of other objects. In addition, color modification may render objects difficult or impossible for avatars to discern. Color modifications are changes to the manner in which the color of an object is rendered and presented to an avatar. Color modifications may occur because of ambient lighting conditions.

For example, nearby light sources may cause a glare that may prevent an avatar from clearly seeing the object. Also, nighttime darkness may prevent an avatar from clearly viewing an object, if at all. Additionally, an avatar may don items collected from the virtual universe that modifies the manner in which an avatar views the object. For example, sunglasses worn by an avatar may prevent the avatar from clearly viewing an object.

Therefore, the illustrative embodiments recognize that visual color properties of an object in a virtual universe may need to be altered in a manner to make the object more easily viewed by avatars. For example, if an avatar is moving through the terrain of a virtual universe at nighttime, objects may be obscured due to the lack of ambient lighting. However, objects may be made more visible in the nighttime environment by modifying the color properties of the object, such as the object's brightness. Other color properties include hue and saturation, which may also be modified to increase the visibility of the object.

Brightness, hue, and saturation may be implemented in a virtual universe client on a red, green, and blue (RGB) scale of 0 through 255. Colors in a virtual universe client are presented as a combination of these three colors. For example, red has an RGB value of 255, 0, 0. Green has an RGB value of 0, 255, 0. Blue has an RGB value of 0, 0, 255. White has an RBG value of 0, 0, 0. Black has an RGB value of 255, 255, 255. All other colors have unique combinations of red, green, and blue pixel color values. Pixel color values are the numerical values of the red, green, and blue of a pixel or a set of pixels on an object.

Color properties may be modified by altering a color's RGB values in a predefined manner. For example, an object's brightness may be modified by altering RGB values equally. Similarly, a color's hue and saturation may be changed by changing a color's RGB values in a different predefined manner. Modification of an object's color properties may facilitate viewing of the object by an avatar in a virtual universe. For example, modification of the object's color properties may make an object appear brighter in dark surroundings and thus more easily viewable. Similarly, the hue or contrast of the object may be altered to make the object more obvious and/or visible.

According to one embodiment of the present invention, object avatar tracking data is obtained which identifies a location of an avatar in relation to a range of an object. A range is a distance from an object. The range may be predefined and subdivided into two or more regions. For example, a range may be divided into a viewable field and a detection zone. Object methods may be invoked and applied to an object based upon an avatar's location within the range of the object. The object methods may modify the color of the object and/or visual elements presented on the object.

An avatar's location is determined from avatar tracking data. Avatar tracking data is obtained from at least one of an object avatar rendering table and an object based avatar tracking controller. In other words, the tracking data for the avatar may be obtained from either the object avatar rendering table, the object based avatar tracking controller, or both. However, in other embodiments, the avatar tracking data may be obtained from any other source.

After obtaining the avatar tracking data, the process calculates modified pixel color values to form a modified color in response to detecting a condition for triggering modification of the object. Thereafter, the process modifies a color of the object to form the modified color when the location of the set of avatars is within the range of the object. As used herein, the term "set" refers to one or more. Thus, a set of pixel color constraints includes one or more constraints or rules limiting the color of an object.

Figure 3:
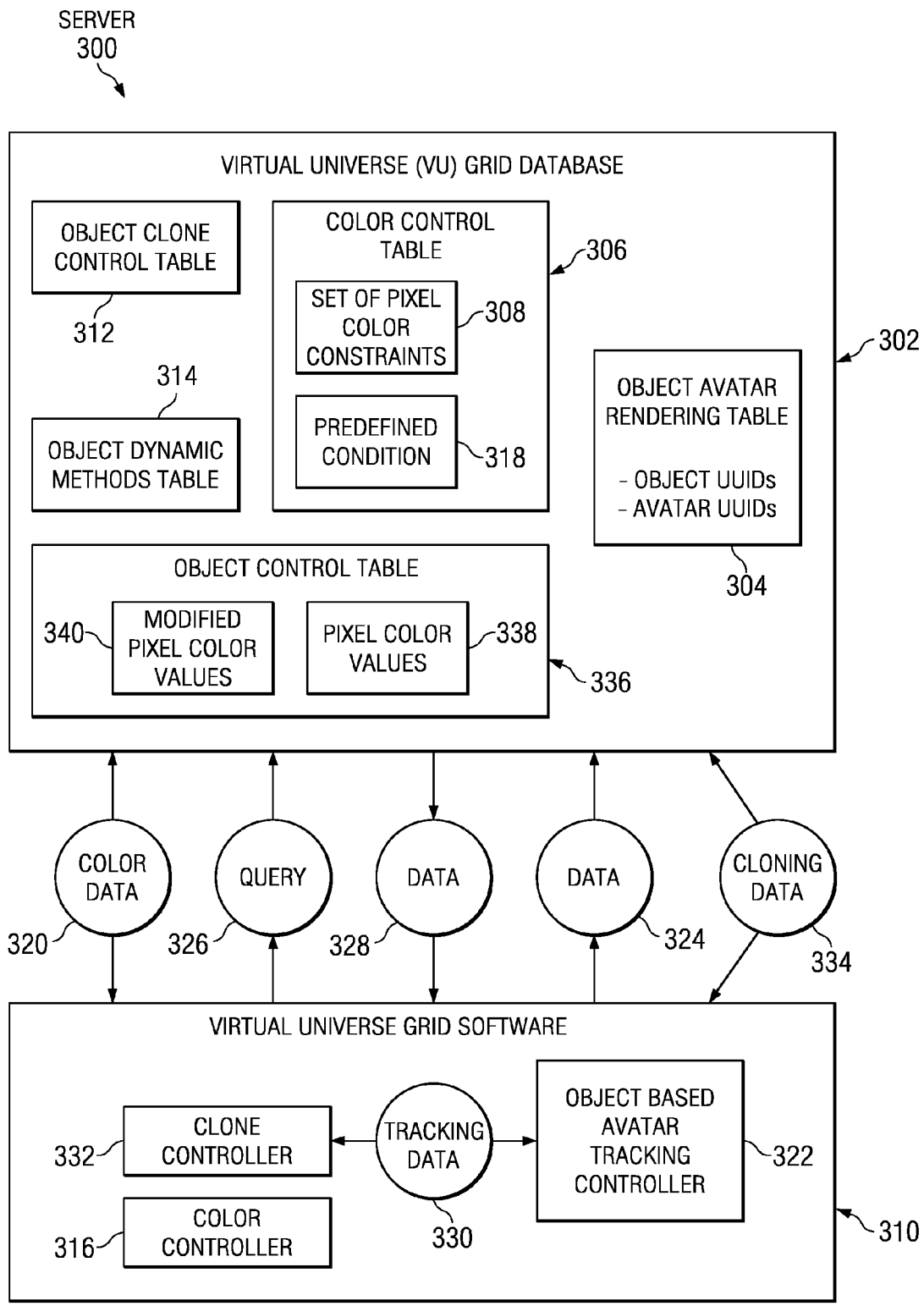
FIG. 3 is a block diagram illustrating a virtual universe grid server in accordance with an illustrative embodiment.

FIG. 3 is a block diagram illustrating a virtual universe grid server in accordance with an illustrative embodiment. Server 300 is a server, such as server 104 in FIG. 1. Server 300 may be associated with a virtual universe. Server 300 may be a single, stand alone server, or server 300 may be a server in a virtual universe grid computing system or in a cluster of two or more servers. In this example, server 300 is a server in a grid computing system for rendering and managing a virtual universe.

In a virtual universe, assets, avatars, the environment, and anything visual are correlated with universally unique identifiers (UUIDs) tied to geometric data, textures, and effects data. Geometric data is data associated with the form or shape of avatars and objects in the virtual universe. Geometric data may be used to construct a wire frame type model of an avatar or object. Geometric data is distributed to a user's client computer as textual coordinates. Textures are distributed to a user's client computer as graphics files, such as JPEG files. Texture data refers to the surface detail and surface textures or color that is applied to wire-frame type geometric data to render the object or avatar. Effects data is typically rendered by the user's client according to the user's preferences and the user's client device capabilities.

Virtual universe grid database 302 is a database on the grid computing system for storing data associated with a virtual universe. This data includes, without limitation, the universally unique identifiers and the associated geometric data, textures, and effects data. This data may be stored in one or more tables within virtual universe grid database 302. For example, virtual universe grid database 302 includes object avatar rendering (OAR) table 304. Object avatar rendering table 304 is a table that stores universally unique identifiers for objects and avatars and other data describing avatars within a viewable field of the object or within a selected zone associated with the object. For example, if the selected objects include object A and object B, then object avatar rendering table 304 stores a universally unique identifier for object A, universally unique identifiers and other data for all avatars within the viewable field of object A, universally unique identifiers for object B, and universally unique identifiers and other data for all avatars within the viewable field of object B.

In this illustrative example in FIG. 3, virtual universe grid database 302 also includes color control table 306. Color control table 306 is a table that includes set of pixel color constraints 308. Set of pixel color constraints 308 is one or more limitations that govern the color of an object in a virtual universe. Set of pixel color constraints 308 may specify upper and lower RGB values that may be applied to a part of an object. Set of pixel color constraints 308 is discussed in more detail with respect to FIG. 4.

Virtual universe grid database 302 also includes object color table 336. In this illustrative example, object color table 336 is a table storing pixel color values 338. Pixel color values 338 are the numerical values for the red, green, and blue colors for a pixel or set of pixels of an object. Object color table 336 may also include modified pixel color values 340. Modified pixel color values 340 are pixel color values that have been modified according to set of pixel color constraints 308. Object color table 336 may also include object universally unique identifiers for associating pixel color values 338 with the objects found in a virtual universe. Although in this example, object color table 336 is a table, in alternate embodiments, object color table 336 may be any form of data structure capable of storing pixel color values 338 and object universally unique identifiers.

For example, an object in a virtual universe may be a soda can displaying a company's trademark colors having colors specified by pixel color values 338. Set of pixel color constraints 308 may limit the manner in which the object and/or the trademarked colors are rendered and presented to an avatar in a virtual universe. Thus, set of pixel color constraints 308 may prevent the soda can's trademarked red and white design from being rendered in a color scheme that would prevent a user from quickly and easily recognizing the object. For example, the soda can having distinctive red and white markings may not be easily recognizable by a user if the soda can were rendered in a dark maroon and gray color scheme that may be applied if the soda can were viewed in a dimly lit virtual universe environment. Consequently, a user encountering the soda can is able to quickly and easily associate the trademarked colors and design with the object owner.

In one embodiment, an object in a virtual universe is modified in relation to all avatars within the range of the object. In an alternate embodiment, each avatar in the range of the object is presented with a clone of the object. Additionally, each clone of the object is then modified according to the unique conditions associated with each avatar. To enable cloning of objects, virtual universe grid software 310 includes object clone control table 312. Virtual universe grid software 310 is a client-side application that exchanges data with virtual universe grid database 302 for rendering and managing the virtual universe.

Object clone control table 312 is a table storing, among other things, object universally unique identifiers, avatar universally unique identifiers, and instance universally unique identifiers. Instance universally unique identifiers are universally unique identifiers assigned to each clone that is created in a virtual environment. Instance universally unique identifiers allow methods to identify and modify the various clones that exist in a virtual universe.

The object methods that may be applied to each clone are stored in object dynamic methods table 314. Object dynamic methods table 314 is a table storing the object methods that may be applied to clones identified in object clone control table 312. In addition, object dynamic methods table 314 may associate each method with priority logic. The priority logic may be used for determining the order in which methods may be executed in the event that an object is subject to modification by more than one method.

Data stored in virtual universe grid database 302 is usable by virtual universe grid software 310. Virtual universe grid software 310 includes color controller 316. Color controller 316 is a software program for controlling the color of an object in a virtual universe. In particular, color controller 316 is capable of modifying the color of an object with reference to set of pixel color constraints 308.

Reference to set of pixel color constraints 308 for controlling the color modifications of an object may be triggered, in part, by predefined condition 318 stored in color control table 306. For example, color controller 316 may be triggered to modify the color of an object if a delta RGB value exceeds a predefined threshold. The delta RGB value may be calculated from a difference in RGB values of the object as originally rendered and the RGB values after the object has been modified by invocation of an object method. The threshold may be set out in color control table 306. If the threshold has been exceeded, then color controller 316 may modify the color of the object. Additionally, the predefined threshold may be determined based upon the comparative brightness of an object in relation to the brightness of the nearby virtual universe environment. In other words, if the brightness of the object and the environment lack a threshold difference in brightness, then the object may be indistinguishable from the virtual universe environment. Hence, the object brightness may be increased to make the object more visible.

Color controller 316 receives color data 320 to determine whether predefined condition 318 has been satisfied. Color data 320 is data relating to the color of objects encountered by an avatar in a virtual universe. Color data 320 may originate from tables within virtual universe grid database 302. For example, color data 320 may originate from color control table 306, or from an object table (not shown) that stores texture data for objects populating a virtual universe. Color data 320 may include an RGB value for the pixels of an object. In addition, color data 320 may include an RGB value for the effects applied to a pixel. The effects applied to the pixel may include, for example, a color change for presenting shadows, smoke, flames, lighting, or other effects. The RGB values for the effects applied to the pixel may be determined by querying a virtual universe client's effects settings to identify the effects being applied. Consequently, the resultant delta RGB value for a pixel may be calculated. Once calculated, color controller 316 may then determine whether the pixel's color should be modified based upon set of pixel color constraints 308.

Color data 320 may also include set of pixel color constraints 308. Thus, color controller 316 may use color data 320 to determine whether the coloring of the object comports with set of pixel color constraints 308.

Object based avatar tracking controller 322 is a software program that manages information describing the location of an avatar in a virtual universe in relation to an object. In particular, object based avatar tracking controller 322 stores data 324 in object avatar rendering table 304. Data 324 includes the universally unique identifiers and other data describing avatars within the viewable field of the selected objects. When object based avatar tracking controller 322 needs data from object avatar rendering table 304 for initiating or implementing geometric and texture modifications in the virtual universe, object based avatar tracking controller 322 sends query 326 to object avatar rendering table 304. In response to query 326, virtual universe grid database 302 sends data 328 to virtual universe grid software 310 for utilization by object based avatar tracking controller 322 to track avatars and, in some embodiments, implement modifications of the selected objects to improve the position and appearance of the selected objects within the virtual universe and enable improved visibility of the selected objects.

Tracking data 330 is data that identifies a location of an avatar in relation to a range of an object. Tracking data 330 may be obtained by clone controller 332 for generating clones of objects. In this example, clone controller 332 obtains tracking data 330 from object based avatar tracking controller 322 as tracking data 330 is generated. However, in an alternate embodiment, clone controller 332 may obtain tracking data 330 from object avatar rendering table 304. In yet another embodiment, clone controller 332 may obtain tracking data 330 from any other source.

The clones may then be presented to a set of avatars in a range of the object. Clone controller 332 is software for generating clones of objects within a virtual universe. Clone controller 332 may generate a clone of an object for each avatar in a particular range of an object. A range of an object is an area proximate to an object and may include one or more sub regions. For example, a range of an object includes a viewable field and a detection area, as is depicted in regard to object 902 in FIG. 9.

Clone controller 332 initiates the process of generating clones when the location of an avatar is within a range of an object. Clone controller 332 may determine that the avatar's location is in the range of an object by obtaining tracking data 330. Tracking data 330 is data that identifies a location of an avatar in relation to a range of an object. In this example, clone controller 332 obtains tracking data 330 from object based avatar tracking controller 322 as tracking data 330 is generated. However, in an alternate embodiment, clone controller 332 may obtain tracking data 330 from object avatar rendering table 304. In yet another embodiment, clone controller 332 may obtain tracking data 330 from any other source.

Each clone that is generated may be rendered according to a different object method. For example, an object method may illuminate a portion of the object, enhance the size of an object, change the color of an object, or remove the effect of another method that otherwise obscures the object. For clone controller 332 to keep track of the various clones and object methods, clone controller 332 stores cloning data 334 into object clone control table 312. Cloning data 334 is data that includes the universally unique identifiers of objects, avatars, and clones. Clone controller 332 may also reference cloning data 334 stored in object clone control table 312 for identifying and invoking a set of object methods that may be rendered with respect to each clone.

The clones may be used to improve the visibility of the object from which the clone was derived. In one embodiment, improved visibility may be achieved by cloning the object so that each cloned object may be modified in a selected manner. In this manner, each avatar that encounters an object may be presented with an object modified in a manner deemed optimized by one or more predefined rules. For example, two avatars may approach the same object from a different location. If each location is a different distance from the object, then each avatar may be presented with a clone of the object having a color that facilitates viewing of the object by a particular avatar.

Figure 4:
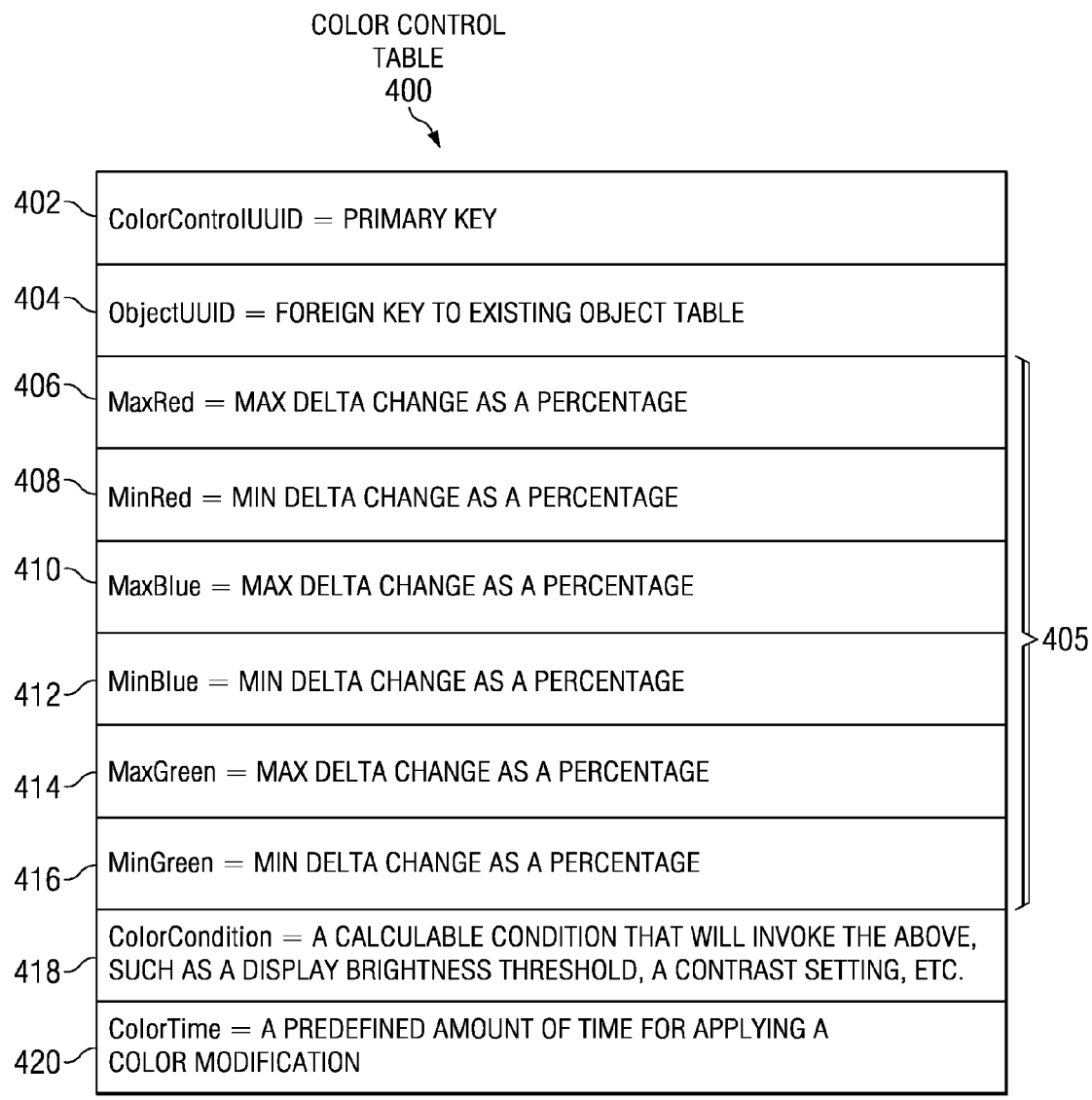
FIG. 4 is diagram of a color control table in accordance with an illustrative embodiment.

FIG. 4 is a diagram of a color control table in accordance with an illustrative embodiment. Color control table 400 is a color control table such as color control table 306 in FIG. 3. Color control table 400 includes unique records for the geometries and textures that form the various objects of a virtual universe. Each record may include, without limitation, the sample data fields presented in color control table 400.

ColorControlUUID 402 is a primary key field for color control table 400. ColorControlUUID 402 differentiates the unique entries in color control table 400. A single object may be associated with more than one entry in color control table 400. An object has more than one entry in color control table 400 if the object has more than one type of geometry or texture. ObjectUUID 404 is a foreign key field to an existing object table storing data identifying the objects found in a virtual universe and the methods that may be applied to each object.

Color control table 400 includes set pixel color constraints 405. Set of pixel color constraints 405 is a range of maximum and minimum allowable RGB values that may be applied to pixels of an object. Set of pixel color constraints 405 includes MaxRed 406. MaxRed 406 is a field that stores a value for a maximum allowable value for red. Similarly, MaxBlue 410 and MaxGreen 414 are fields that store values for maximum values for blue and green, respectively. Similarly, MinRed 408, MinBlue 412, and MinGreen 416 store the minimum allowable values for red, blue, and green, respectively.

In one embodiment, the maximum and/or minimum values may be defined in terms of a maximum allowable percent of change. For example, an RGB value may be modified from an original color by at most 10 percent. Thus, for a particular pixel associated with a given ColorControlUUID, the value stored in MaxRed 406, MaxBlue 410, and MaxGreen 414 is 10. As such, the maximum allowable percent of change for the pixel associated with a given ColorControlUUID is 10 percent. In other words, if a pixel has an RGB value of 100, 100, 100, the maximum allowable RGB value for this color would be 110, 110, 110. The RGB values of 110, 110, 110 are values that are 10 percent larger than the original RGB values of 100, 100, 100.

In another embodiment, set of pixel color constraints 405 may identify the upper and lower permissible RGB values. For example, a pixel associated with a given ColorControlUUID may have a MaxRed 406 value of 115, a MaxBlue 410 value of 110, and a MaxGreen 414 value of 112. The pixel may have an unmodified RGB value of 110, 110, and 110. If a method is invoked to modify the RGB value of the pixel to increase the RGB values, the pixel may be modified only until the maximum RGB values specified in set of pixel color constraints 405 is attained. Thus, the pixel may be modified to include RGB values up to and including a red value of 115, a blue value of 110, and a green value of 112.

The individual RGB values set forth in set of pixel color constraints 405 may be hard coded into color control table 400. Alternatively, the RGB values in set of pixel color constraints 405 may be specified by defining a relationship or equation for hue, saturation, and brightness and applying those equations to the original RGB values of the pixel. For example, a brightness of a color may be increased by increasing the red, green, and blue values equally. A 10 percent increase in brightness may correlate with a 10 percent increase in each of the red, blue, and green values. Thus, the values of set of pixel color constraints 405 may be defined by specifying the allowable change in brightness of a color. Set of pixel color constraints 405 may also be defined with respect to any other color properties, such as hue, contrast, or saturation.

ColorCondition 418 is a field storing a calculable value that may be used to determine whether a color controller, such as color controller 316 in FIG. 3, should modify a color of an object, or one or more pixels of the object, within a virtual universe. The value stored in ColorCondition 418 may be, for example, a threshold contrast, hue, saturation, or brightness. Thus, if a color controller detects that a threshold value stored in ColorCondition 418 has been exceeded, then the color controller may initiate a color modification method. In addition, the value stored in ColorCondition 418 may be a permissible delta for RGB values. Another example of the value stored in ColorCondition 418 may be a time of the day in a virtual universe. The value of ColorCondition 418 may trigger the modification of a color of an object or one or more pixels of the object.

ColorTime 420 is a field storing a value specifying a predefined period of time for which an object's color is modified. Thus, for example, an object that is made brighter to enable one or more avatars to view the object more easily may be made brighter for the time period specified in ColorTime 420. Consequently, a dark environment in a virtual universe will not be overly populated with brightly rendered objects.

FIG. 5 is a block diagram of an object avatar rendering table in accordance with an illustrative embodiment. Object avatar rendering table 500 is an example of data in an object avatar rendering table, such as object avatar rendering table 304 in FIG. 3.

RenderingUUID 502 is a primary key for object avatar rendering table 500. ObjectUUID 504 is a universally unique identifier for a selected object in a virtual universe. ObjectUUID 504 is a foreign key to the existing object table. AvatarUUID 506 is a foreign key to the existing avatar table. AvatarUUID 506 includes a universally unique identifier for each avatar in the viewable field of the object associated with ObjectUUID 504.

Zone1EnterTime 508 is a field of a date and/or time when an avatar enters a first zone within the viewable field of an object. Zone1LeaveTime 510 is a field for a date and/or time when the avatar leaves the first zone. Zone2EnterTime 512 is a field in object avatar rendering table 500 for storing a date and/or time when an avatar enters a second zone. The second zone may be an area that is outside the viewable field. In other words, the second zone is an area in which an avatar cannot see the selected object, but the area is in close proximity to the viewable field in which the avatar will be able to see the object. Thus, when an avatar enters the second zone, the object avatar tracking controller software may begin preparing to display the object to the avatar when the avatar does eventually enter the viewable field.

Zone2LeaveTime 514 is a field for storing the date and/or time when a given avatar leaves the second zone. NumberofZone1Enters 516 is a field for storing the number of times a particular avatar has entered the first zone. This information may be useful to determine whether a user operating the particular avatar has never viewed the object. If the user has never viewed the object, then the content associated with an object should be displayed in full to the user associated with the avatar. The information in NumberofZone1Enters 516 is also used to determine whether the user has viewed the object one or more times in the past, and therefore, the content associated with the object should be displayed in part, skip introductory material, be modified or abbreviated, or otherwise altered so that the exact same content is not displayed to the user every time the user is within the viewable field of the object.

NumberofZone2Enters 518 is a field for storing the number of times an avatar has entered the second zone. LastCoordinates 520 is a field for storing the coordinate data describing where a given avatar is within the first zone or the second zone of a selected object. The coordinate data is typically given in xyz type coordinate data.

Figure 6:
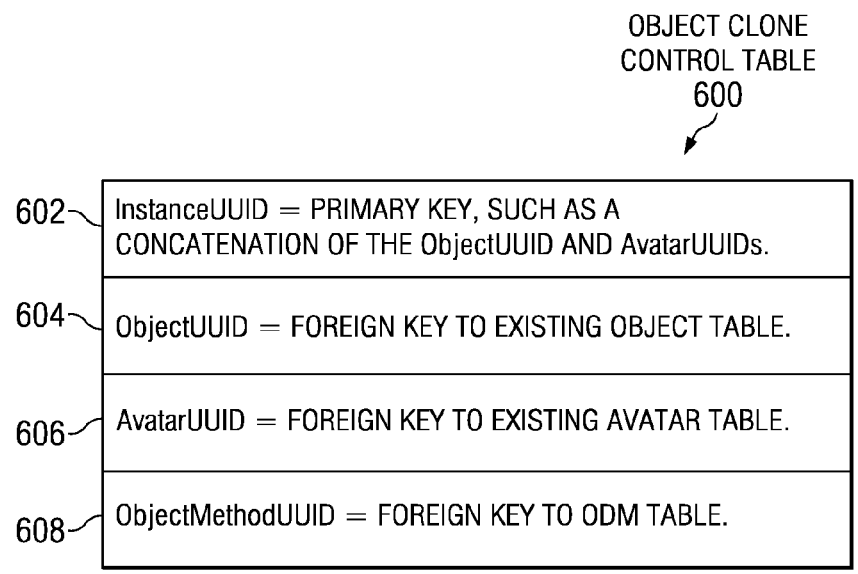
FIG. 6 is a block diagram of an object clone control table in accordance with an illustrative embodiment.

FIG. 6 is a block diagram of an object clone control table in accordance with an illustrative embodiment. Object clone control table 600 is an example of data in an object clone control table, such as object clone control table 312 in FIG. 3.

InstanceUUID 602 is a primary key for object clone control table 600. In one embodiment, InstanceUUID 602 is a concatenation of avatar and object universally unique identifiers.

ObjectUUID 604 is a universally unique identifier for a selected object in a virtual universe. ObjectUUID 604 is a foreign key to the existing object table. AvatarUUID 606 is a foreign key to the existing avatar table. AvatarUUID 606 includes a universally unique identifier for each avatar in the viewable field of the object associated with objectUUID 604. ObjectMethodUUID 608 is a foreign key linking to an object dynamic methods table, such as object dynamic methods table 700 in FIG. 7.

Figure 7:
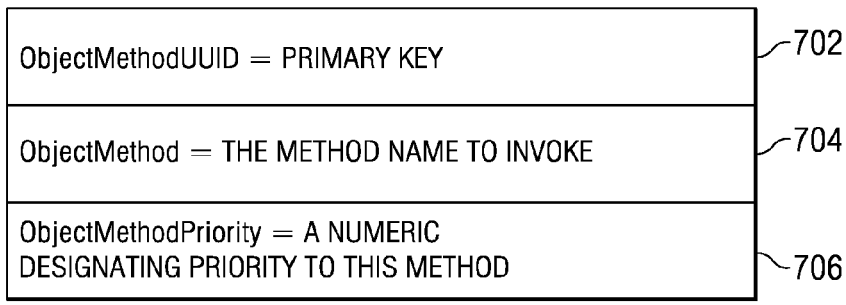
FIG. 7 is a block diagram of an object dynamic methods table in accordance with an illustrative embodiment.

FIG. 7 is a block diagram of an object dynamic methods table in accordance with an illustrative embodiment. Object dynamic methods table 700 is an example of data in a dynamic methods table, such as object dynamic methods table 314 in FIG. 3.

ObjectMethodUUID 702 is a primary key for object dynamic methods table 700. ObjectMethodUUID 702 is related to ObjectMethodUUID 608 in FIG. 6 for identifying the method(s) that may be invoked with respect to a clone identified by InstanceUUID 602 in FIG. 6.

ObjectMethod 704 is a field of data storing the name of the method that may be invoked for application to an object. ObjectMethod 704 may include one or more methods that may be invoked for application to an object. The order in which the methods are to be invoked is determined according to priority logic. In one embodiment, the priority logic specifies that methods are invoked in accordance with a relative priority ranking. The rankings may be stored in ObjectMethodPriority 706.

ObjectMethodPriority 706 is a field storing a numeric designating the priority in which methods of object methods table 700 may be invoked. For example, in the event that multiple methods are queried for an object, or a clone of the object, the numeric in ObjectMethodPriority 706 may be referenced to determine the order in which the methods are to be invoked.

In an illustrative embodiment, object clone control table 600 and object dynamic methods table 700 are linked by an ObjectMethodUUID field, such as ObjectMethodUUID 608 in FIG. 6 and ObjectMethodUUID 706 in FIG. 7. The linking of object clone control table 600 and object dynamic methods table 700 enables a clone controller, such as clone controller 332 in FIG. 3, to determine whether a clone of an object exists. For example, the clone controller may determine that a clone of an object exists if there exists in an object clone control table an InstanceUUID identifying a clone of the object. In one embodiment, this determination may be initiated when an avatar enters a detection area of an object.

The entrance of an avatar into the detection area of an object may also cause a clone controller to instantiate a set of object clones. Thus, an avatar may be presented with two clones for an object. The first clone may be of an object located at a fixed point. The second clone may be of an object that remains in the field of view of the avatar regardless of the direction in which the avatar is facing.

Further, the clone controller may use linked object clone control table 600 and object dynamic methods table 700 to invoke a set of object methods associated with the clone identified by the unique InstanceUUID. In one embodiment, the set of methods may be invoked when an avatar enters a viewable area of an object. Viewable areas are discussed in more detail in FIG. 9.

Figure 8:
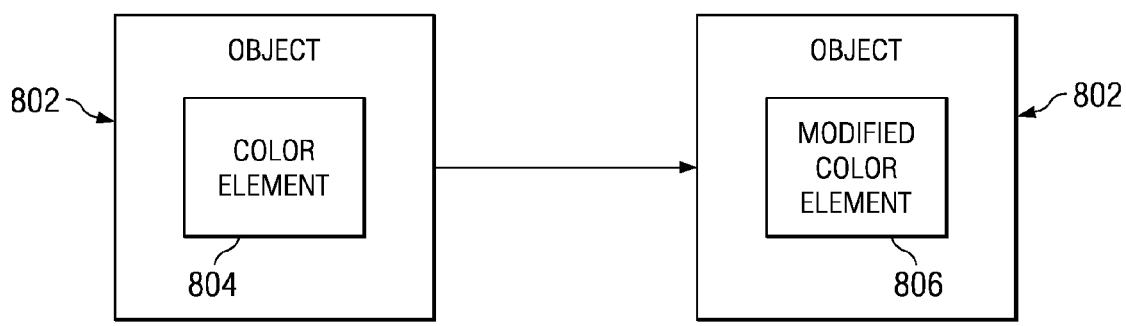
FIG. 8 is a diagram depicting a color modification of an object in accordance with an illustrative embodiment.

FIG. 8 is a diagram depicting a color modification of an object in accordance with an illustrative embodiment. Object 802 is an entity in a virtual universe that is not directly controlled by a user or associated with a user's account. An object may be, for example, buildings, statues, billboards, signs, and advertisements in the virtual universe. In this example, object 802 is an advertisement, such as a billboard or a sign.

Object 802 includes color element 804. Color element 804 is a color applied to a set of pixels or geometries of object 802 as defined by texture data associated with object 802. The color may be expressed in terms of RGB values. Before object 802 is presented to an avatar in the viewable range of object 802, one or more methods may be invoked to modify the appearance of object 802. One modification may be the alteration of color element 804 that may make object 802 more difficult to discern. For example, object 802 may be a billboard that is encountered by an avatar at nighttime. Thus, color element 804 may be darkened. However, the darkened billboard may be difficult to see by nearby avatars. Therefore, a color controller, such as color controller 316 in FIG. 3, may transform color element 804 to modified color element 806.

Modified color element 806 is a color applied to a set of pixels or geometries of object 802 that is determined based upon a set of pixel color constraints such as pixel color constraints 405 in FIG. 4. Modified color element 806 may be easier for an avatar to see. For example, modified color element 806 may have a threshold brightness that enables an avatar to clearly see object 802 in the darkness.

Figure 9:
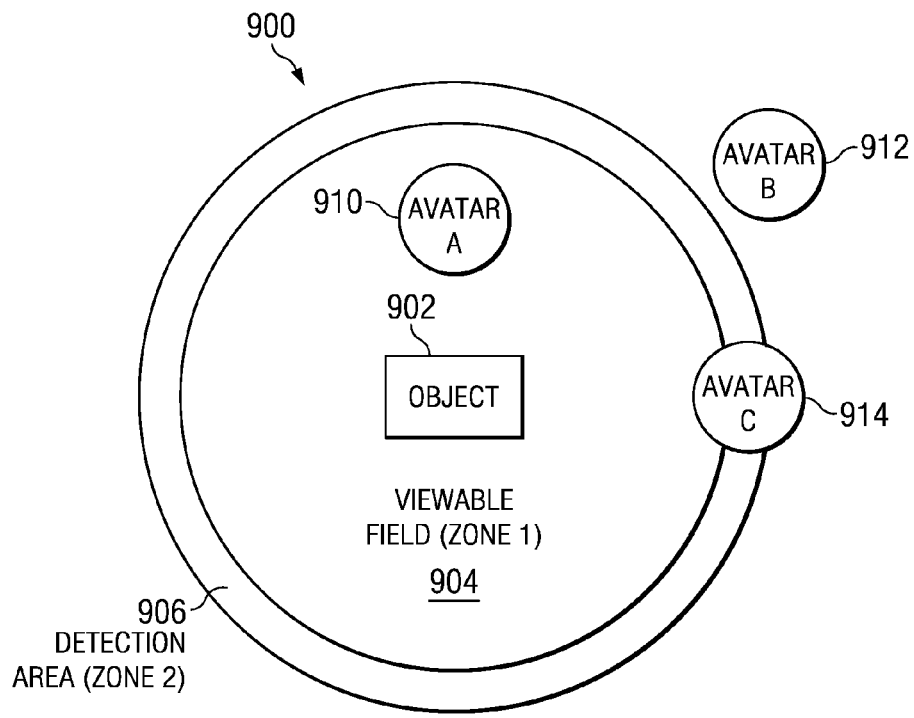
FIG. 9 is a block diagram of a viewable area for an object in accordance with an illustrative embodiment.

FIG. 9 is a block diagram of a viewable area for an object in accordance with an illustrative embodiment. Range 900 is defined with respect to object 902. Object 902 is an entity in a virtual universe that is not directly controlled by a user or associated with a user's account. An object may be, for example, buildings, statues, billboards, signs, and advertisements in the virtual universe. In this example, object 902 is an advertisement, such as a billboard or a sign. Range 900 is an area associated with the viewing of object 902. Range 900 includes viewable field 904 and detection area 906 associated with object 902 in a virtual universe.

Viewable field 904 is an area in a given proximity of object 902. Viewable field 904 has a focal point or center at a location that is the same as the location of object 902. Viewable field 904 may also be referred to as zone 1 or a first zone. An avatar in viewable field 904 is able to see or view object 902 and/or content associated with object 902. For example, object 902 may be associated with video and/or audio content. Object 902 may have some movement associated with the object. For example, object 902 may be capable of some limited movement or animation. However, object 902 is substantially limited to a single location in the virtual universe.

Detection area 906 is an area adjacent to viewable field 904 within range 900. Detection area 906 may also be referred to as a second zone or zone 2. An avatar in detection area 906 cannot see object 902 or view content associated with object 902. However, when an avatar enters detection area 906, the object avatar tracking controller software can begin preparing to display object 902 and content associated with object 902 to the avatar when the avatar enters viewable field 904.

In this example, avatar A 910 is within viewable field 904. Therefore, avatar A 910 is able to view or see object 902. Avatar B 912 is not able to see or view object 902. In addition, avatar B 912 is not close enough to viewable field 904 to indicate that avatar B 912 may be preparing to enter viewable field 904. Avatar C 914 is within detection area 906. Avatar C 914 is not able to see or view object 902. However, the presence of avatar C 914 indicates that avatar C 914 may be about to enter viewable field 904 or that avatar C 914 has just left viewable field 904. Avatar B 912 is outside range 900. Therefore, an object avatar tracking table for object 902 includes entries for avatar A 910 in zone 1 and avatar C 914 in zone 2. However, the object avatar tracking table will not include data or records for avatar B 912 because avatar B 912 is outside both viewable field 904 and detection area 906.

Objects are prevalent in virtual universes. The illustrative embodiments recognize that objects in a particular user's viewable field may be obstructed from view by one or more other objects such that a user cannot see the object because of the obstruction. In such cases, the focal point of the viewable area for an object may be set at a location other than the location of the object.

Figure 10:
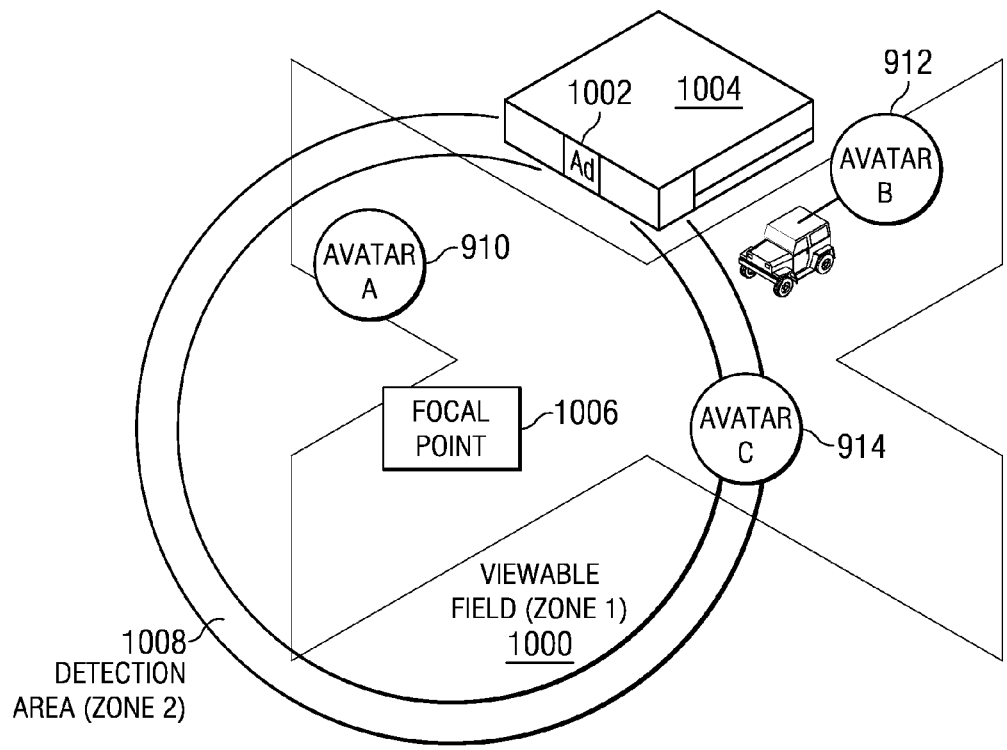
FIG. 10 is a block diagram of a viewable area for an object having a focal point at a location other than the location of the object in accordance with an illustrative embodiment.

FIG. 10 is a block diagram of a viewable area for an object having a focal point at a location other than the location of the object in accordance with an illustrative embodiment. Viewable field 1000 is a viewable field for object 1002. Object 1002 is an object, such as object 800 in FIG. 8. In this example, object 1002 is an advertisement in front of object 1004. Viewable field 1000 is a range in which an avatar, such as avatar A 910, avatar B 912, and avatar C 914 can see object 1002.

Viewable field 1000 has focal point 1006. Focal point 1006 is a point from which the range, or area, of viewable field 1000 for an object is determined. In other words, viewable field 1000 is an area that is identified based on a predetermined radius or distance from focal point 1006. Here, focal point 1006 is a location that is different than the location of object 1002 because object 1002 is adjacent to an obstructing object, such as object 1004.

In this example, when avatar C 914 comes in range of detection area 1008 of object 1002, object based avatar tracking controller, such as object based avatar tracking controller 322 in FIG. 3, makes a determination as to whether there is an existing session associated with the universally unique identifier of object 1002 and the universally unique identifier of avatar C 914. This step may be implemented by making a query to the object avatar rendering table to determine if avatar C 914 has ever entered zone 2 or zone 1 previously. If there is not an existing session for avatar C 914, the object based avatar tracking controller creates a record in the object avatar rendering table with the universally unique identifier of object 1002 and the universally unique identifier of avatar C 914.

The record in the object avatar rendering table may optionally include additional information, such as, without limitation, a date and time when avatar C 914 entered zone 2, a date and time when avatar C 914 leaves zone 2, a date and time when avatar C 914 enters zone 1, a number of zone 2 enters, a number of zone 1 enters, coordinates of avatar C 914, and any other data describing avatar C 914. This data is used by the virtual universe grid software for analysis, reporting, and billing purposes.

Object 1002 may have an initiation process associated with object 1002. For example, if object 1002 is an advertisement with an audio and video content associated with viewing object 1002, an initiation process may include buffering the audio and/or video content, checking a cache for the audio and/or video content, caching the audio and/or video content, or any other initiation process. In another embodiment, the initiation process may include sending messages to a clone controller, such as clone controller 332 in FIG. 3. The message may notify the clone controller to retrieve tracking data, such as tracking data 330 in FIG. 3, because an avatar is in range of object 1002. In addition, the initiation process may include querying databases to determine the existence of clones of object 1002.

When avatar C 914 enters viewable field 1000, an object based avatar tracking controller may trigger any object initiation process defined by object 1002. For example, when avatar C 914 enters viewable field 1000, the object based avatar tracking controller may display the buffered or cached content. If a user is viewing the object for the first time and object 1002 has a video or audio file associated with viewing the object, the process starts playing the video or audio from the beginning.

In another embodiment, a clone controller, such as clone controller 332 in FIG. 3, may query an object clone control table, such as object clone control table 500 in FIG. 5, and/or instantiate a clone of object 1002 when avatar C 914 enters detection area 1008. Thereafter, when avatar C 914 enters viewable field 1000, a clone controller may invoke a set of methods associated with the object clone of object 1002 for presentation to avatar C 914.

If a session already exists, the object based avatar tracking controller triggers any object re-initiation process defined by the object. For example, if the user is not viewing an object with an associated video for the first time, the process starts playing the video at a point in the video after the beginning, such as after an introduction, in a middle part, or near the end of the video to avoid replaying introductory material.

The object based avatar tracking controller makes a determination as to whether the position of avatar C 914 has changed. Changing position may include traveling, turning, walking, or disappearing, such as teleporting, logging off, or disconnecting. When the position of avatar C 914 changes, the object based avatar tracking controller adds the user position data to the object avatar rendering table, such as at a field for last coordinates 520 in FIG. 5. The user position data includes angle of view coordinate data of the avatar relative to object 1002 and the distance of avatar C 914 to object 1002.

A clone controller, such as clone controller 332 in FIG. 3 may then modify object 1002 according to a set of methods stored in an object dynamic methods table, such as object dynamic methods table 600 in FIG. 6. Modifications may be made by invoking an object method that is selected, in part, upon user position data. The modification of object 1002 is capable of improving the visibility of object 1002 to an avatar in viewable field 1000.

When avatar C 914 is out of range of viewable field 1000 and detection area 1008, the object based avatar tracking controller logs a session pause for the session associated with avatar C 914. The log may include the date and time of the session pause. When the session has been paused for an amount of time that exceeds a threshold amount of time, the object based avatar tracking controller terminates the session associated with avatar C 914. The process termination may include, without limitation, removing the records and data associated with avatar C 914 from the object avatar rendering table. If the record is not deleted, when avatar C 914 comes back into range of zone 1 or zone 2 of object 1002, the object based avatar tracking controller determines that an existing session associated with the universally unique identifier of object 1002 and a universally unique identifier of avatar C 914 already exist. In such a case, a new record for avatar C 914 will not be created. Instead, the data in the object based avatar rendering table will be updated with new data regarding avatar C 914 in the range of object 1002.

Figure 11:
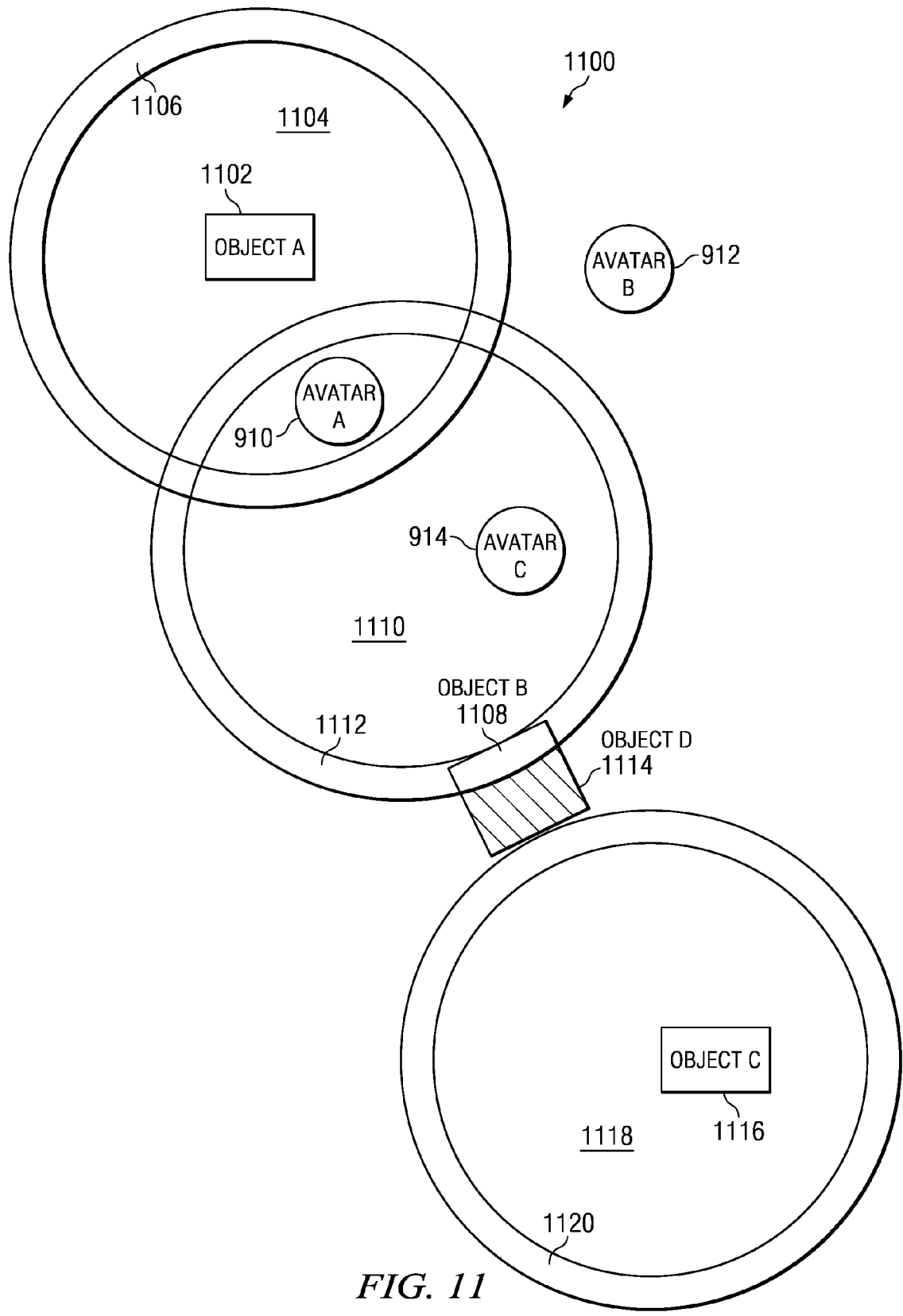
FIG. 11 is a block diagram of viewable areas for a plurality of objects in accordance with an illustrative embodiment.

FIG. 11 is a block diagram of viewable areas for a plurality of objects in accordance with an illustrative embodiment. Region 1100 is a region in a virtual universe. Region 1100 is associated with a server, such as server 104 in FIG. 1. Each region in a virtual universe is typically supported by a different server.

Object A 1102 is associated with viewable field (zone 1) 1104. Object A 1102 may also optionally have a detection area (zone 2) 1106. Viewable field (zone 1) 1110 is a viewable area associated with object B 1108. Object B 1108 may also have detection area (zone 2) 1112. In this example, viewable field (zone 1) 1110 overlaps in part with a portion of viewable field (zone 1) 1104. Object C 1116 is associated with viewable field 1118. Object C 1116 is optionally associated with detection area (zone 2) 1120.

In this example, avatar A 910 is within viewable field (zone 1) 1104 of object A 1102 and viewable field (zone 1) 1110 of object B 1108. In other words, avatar A 910 can see object A 1102 or object B 1108. Avatar C 914 is within viewable field 1110 of object B 1108. Avatar C 914 is able to see or view object B 1108. Avatar B 912 is outside the viewable fields of objects 1102, 1108, 1114, and 1116.

FIG. 12 is a block diagram of a set of clones presented to a set of avatars in accordance with an illustrative embodiment. The set of clones are clones of object 1202.

Object 1202 is associated with a range having viewable field 1204 and detection area 1206. In this example, avatar A 910 and avatar B 912 are located within viewable field 1204. Avatar C 914 is located outside of the range of object 1202.

Because avatar A 910 and avatar B 912 are located within viewable field 1204, avatar A 910 and avatar B 912 are presented with object clone 1208 and object clone 1210, respectively. Object clones 1208 and 1210 are clones of object 1202. Each clone of object 1202 may be rendered differently according to the various methods associated therewith. For example, because avatar A 910 is located further from object 1202, then object clone 1208 may be a clone of object 1202 modified by a geometric and texture modification method that enhances or modifies the color of object 1202.

In addition, because avatar B 912 is located closer to object 1202, but at an angle to object 1202, then object clone 1210 may be a clone of object 1202 modified by a geometric and texture modification method that eliminates glare that may reflect from object 1202.

FIG. 13 is a block diagram of an object based avatar table for a plurality of objects in accordance with an illustrative embodiment. Object based avatar table 1300 is an object based avatar table for a plurality of selected objects. In this example, object based avatar table 1300 includes a universally unique identifier for selected object A 1302 and object B 1320. Data describing avatars for each selected object are also included.

For example, object based avatar table 1300 includes avatar A UUID 1304, avatar A zone 1 enter time 1306, avatar A zone 2 enter time 1308, avatar A zone 1 leave time 1310, and avatar A zone 2 leave time 1312. Object based avatar table 1300 includes data regarding avatars associated with zone 1 and zone 2 of object B 1320. For example, and without limitation, object based avatar table 1300 includes avatar A UUID 1322, avatar A zone 1 enter time 1324, avatar A zone 2 enter time 1326, avatar A zone 1 leave time 1328, avatar A zone 2 leave time 1330, avatar C UUID 1332, avatar C zone 1 enter time 1334, avatar C zone 2 enter time 1336, avatar C zone 1 leave time 1338, and avatar C zone 2 leave time 1340.

The fields and data shown in object based avatar table 1300 are only examples of fields and data that may be included in an object based avatar table. However, implementations of object based avatar tables are not limited to only including the data and/or fields shown in FIG. 13. An object based avatar table may include additional data and/or additional fields not shown in FIG. 13.

In addition, object based avatar table 1300 in this example only includes data and fields for two objects and two different avatars. However, an object based avatar table may include fields and/or data for any number of objects and any number of avatars. In other words, object based avatar table 1300 may include fields and/or data for a single object, as well as two or more objects. Likewise, object based avatar table 1300 may include fields and/or data for tracking a single avatar associated with each object, as well as two or more avatars associated with each object's viewable field and/or detection area.

Figure 14:
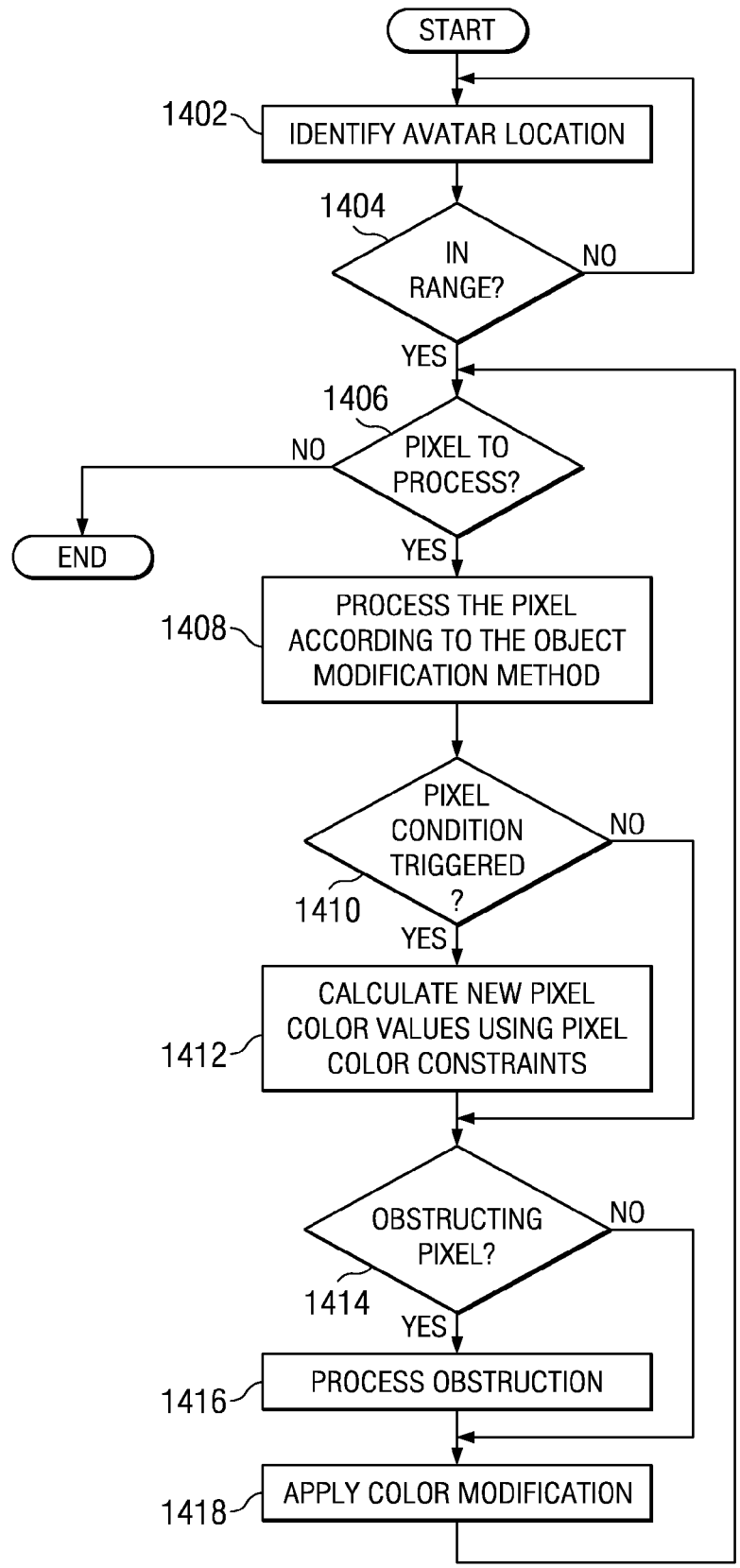
FIG. 14 is a flowchart of steps for color modification of an object in accordance with an illustrative embodiment.

FIG. 14 is a flowchart of steps for color modification of an object in accordance with an illustrative embodiment. The steps of FIG. 14 may be implemented by software such as color controller 316 in FIG. 3.

An avatar's location is identified (step 1402). The avatar's location may be determined by referencing avatar tracking data. Using the avatar tracking data, a determination is made as to whether the avatar is in range of an object (step 1404). If the avatar is not in range of the object, then the an avatar's location is monitored by returning to step 1402.

If the determination is made that the avatar is in range, then a determination is made as to whether there is a pixel to process (step 1406). This determination may be made by determining whether an object modification method has been invoked to modify the pixel of the object. If the determination is made that there is a pixel to process, the pixel is processed according to the object modification method (step 1408).

After processing, a determination is made as to whether a pixel condition has been triggered (step 1410). The pixel condition may be a calculable condition such as the condition that is stored in ColorCondition 418 in FIG. 4. If the pixel condition has been triggered, then a new pixel color value is calculated using a set of pixel color constraints (step 1412). The set of pixel color constraints are pixel color constraints such as set of pixel color constraints 405 in FIG. 4.

Thereafter, a determination is made as to whether an obstructing pixel is present (step 1414). If an obstructing pixel is present, then the obstruction is processed (step 1416). The color modification is then applied (step 1418). The determination is again made as to whether there is another pixel to process. If there are no more pixels to process, then the execution of the color controller terminates.

Returning now to step 1410, if the pixel condition has not been triggered, then the determination is made as to whether an obstructing pixel is present (step 1414). If at step 1414, no pixel obstruction is present, then color modification is applied to the pixel at step 1418.

Figure 15:
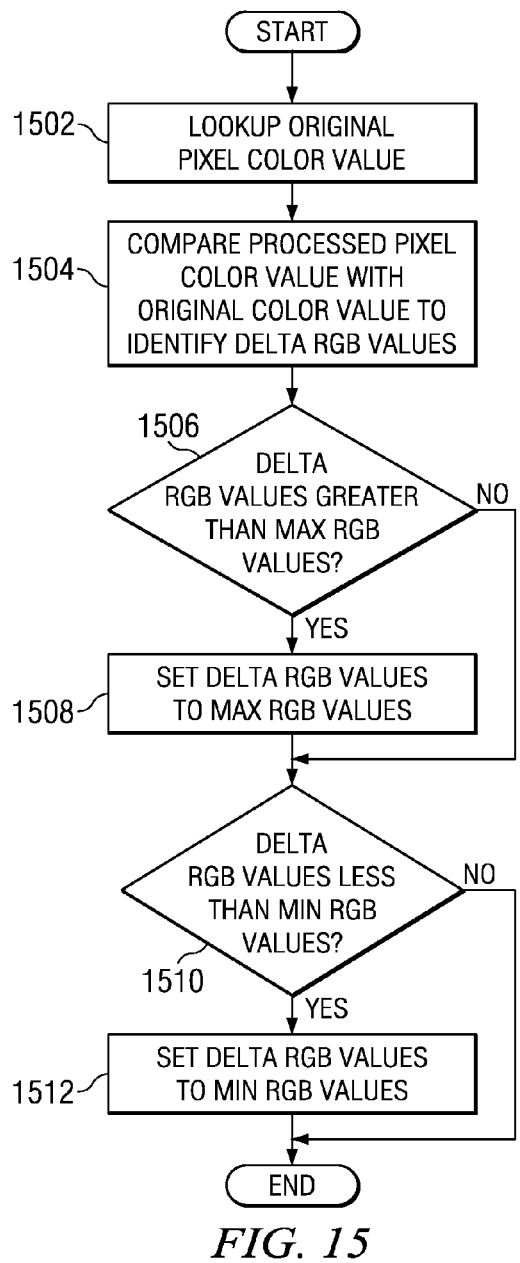
FIG. 15 is a flowchart of a process for calculating object color values to an object rendering in accordance with an illustrative embodiment.

FIG. 15 is a flowchart of a process for calculating object color values to an object rendering in accordance with an illustrative embodiment. The process in FIG. 15 may be implemented by software for controlling modification of object colors, such as color controller 316 in FIG. 3.

The process begins by performing a lookup of an original pixel color value (step 1502). The process then compares the processed pixel color values with the original pixel color values to identify delta RGB values (step 1504).

The process then makes the determination as to whether the delta RGB values are greater than the MaxRGB values (step 1506). If the process makes the determination that the delta RGB values are greater than the MaxRGB values, then the process sets the delta RGB values to the MaxRGB values (step 1508).

The process then makes the determination as to whether delta RGB values are less than MinRGB values (step 1510). If the process makes the determination that delta RGB values are less than MinRGB values, then the process sets the delta RGB values to the MinRGB values (step 1512). The process terminates thereafter.

Returning to step 1506, if the process makes the determination that no delta RGB values are greater than MaxRGB values, then the process skips to step 1510.

Referring to step 1510, if the process makes the determination that delta RGB values are not less than MinRGB values, then the process terminates.

Figure 16:
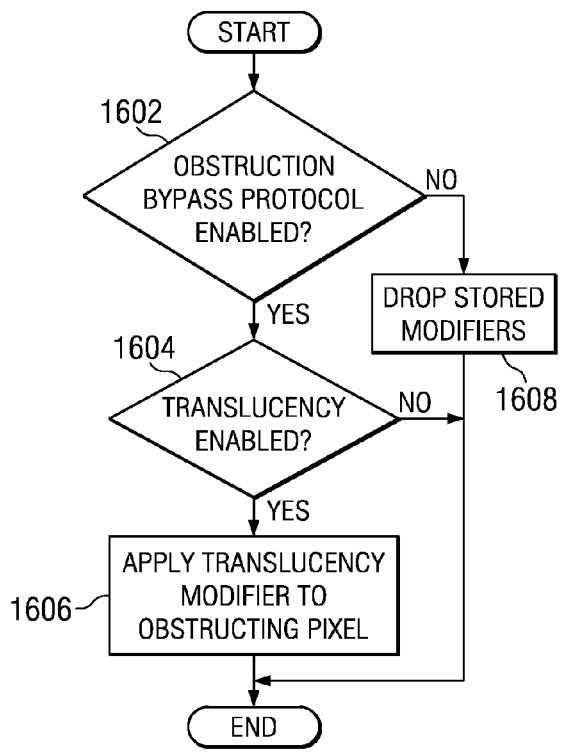
FIG. 16 is a flowchart of a process for processing an obstruction in accordance with an illustrative embodiment.

FIG. 16 is a flowchart of a process for processing an obstruction in accordance with an illustrative embodiment. The process in FIG. 16 may be implemented by software for controlling modification of object colors, such as color controller 316 in FIG. 3.

The process begins by making the determination as to whether an obstruction bypass protocol is enabled (step 1602). If the process makes the determination that the obstruction bypass protocol is enabled, then the process makes the subsequent determination as to whether translucency is enabled (step 1604). If translucency is not enabled, then the process terminates. However, if translucency is enabled, then the process applies a translucency modifier to the obstructing pixel (step 1606) and terminates thereafter.

Returning now to step 1602, if the process makes the determination that the obstruction bypass protocol is not enabled, then the process drops the stored modifiers (step 1608) and terminates.

Figure 17:
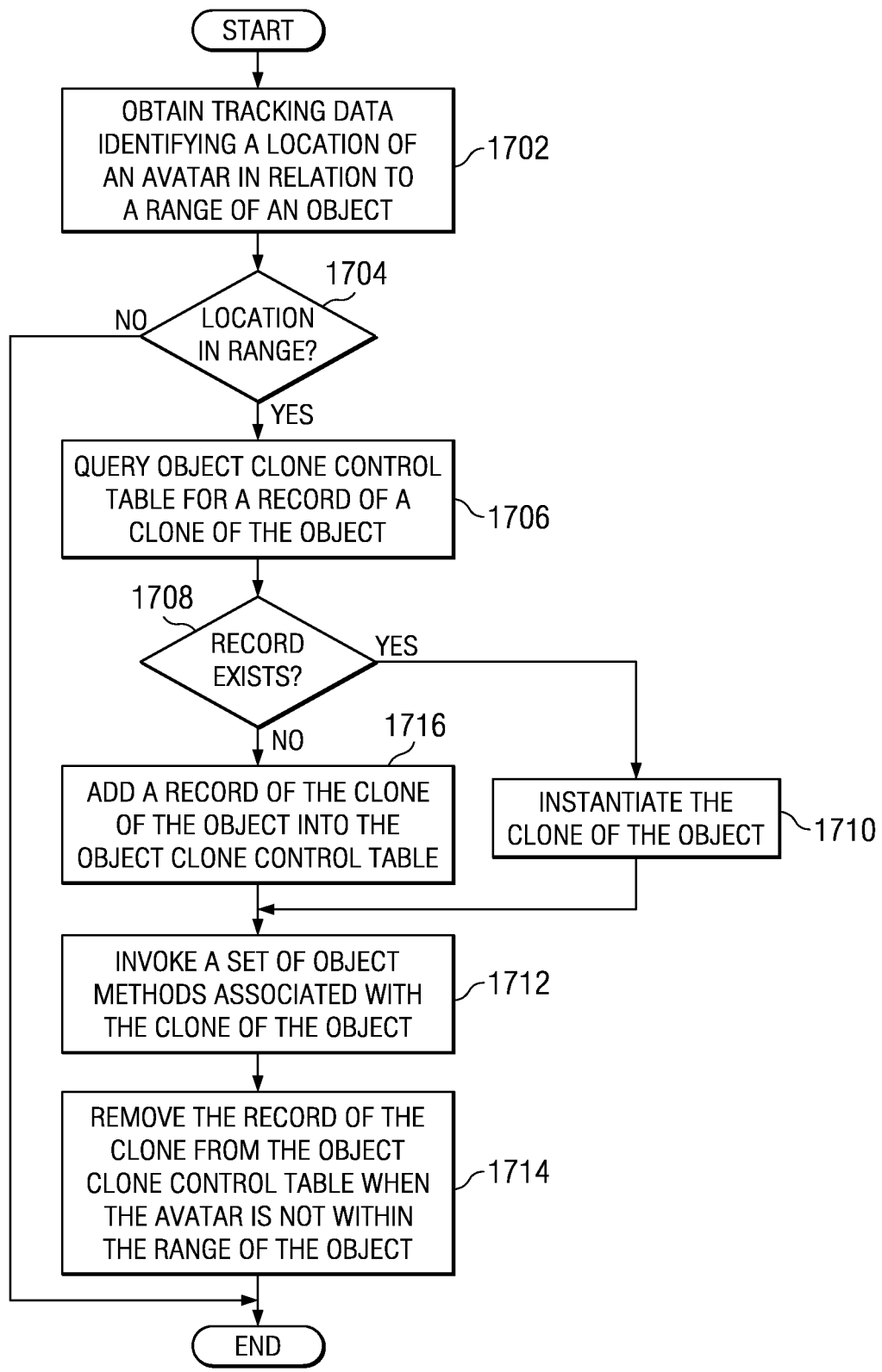
FIG. 17 is a flowchart of a process for cloning objects in a virtual universe in accordance with an illustrative embodiment.

FIG. 17 is a flowchart of a process for cloning objects in a virtual universe in accordance with an illustrative embodiment. The process in FIG. 17 is implemented by software for cloning objects, such as clone controller 332 in FIG. 3.

The process begins by obtaining tracking data identifying a location of an avatar in relation to a range of an object (step 1702). In one embodiment, a clone controller may obtain the tracking data by retrieving (or "pulling") the data from a data structure, such as object avatar rendering table 304 in FIG. 3. In another embodiment, the clone controller may receive the tracking data from another software component. For example, the tracking data may be "pushed" to the clone controller from an object based avatar tracking controller such as object based avatar tracking controller 322 in FIG. 3.

The process then makes the determination as to whether the location of the avatar is in range of the object (step 1704). If the process makes the determination that the location of the avatar is not in range, then the process terminates. However, if the process makes the determination that the location of the avatar is in range of the object, then the process queries an object clone control table for a record of a clone of the object (step 1706).

The process then makes the determination as to whether the object clone control table includes the record of the clone of the object (step 1708). If the process makes the determination that the object clone control database does include a record of the clone of the object, then the process instantiates the clone of the object (step 1710).

The process then invokes a set of object methods associated with the clone of the object (step 1712). The process removes the record of the clone from the object clone control table when the location of the avatar is not within the range of the object (step 1714) and the process terminates. The removal of the record of the clone from the object clone control table may occur upon the expiration of a predetermined amount of time. The predetermined amount of time may specify that a length of time should expire after the avatar has left the range. Thus, the invention can avoid repeatedly initiating and removing the clone if the avatar is repeatedly moving in and out of range. In an alternate embodiment, the predetermined amount of time may be null. In this embodiment, the record of the clone is removed immediately after the avatar has left the range.

Returning now to step 1708, if the process makes the determination that the object clone control table does not have a record for the clone of the object, then the process adds a record of the clone of the object to the object clone control database before proceeding to step 1710.

Figure 18:
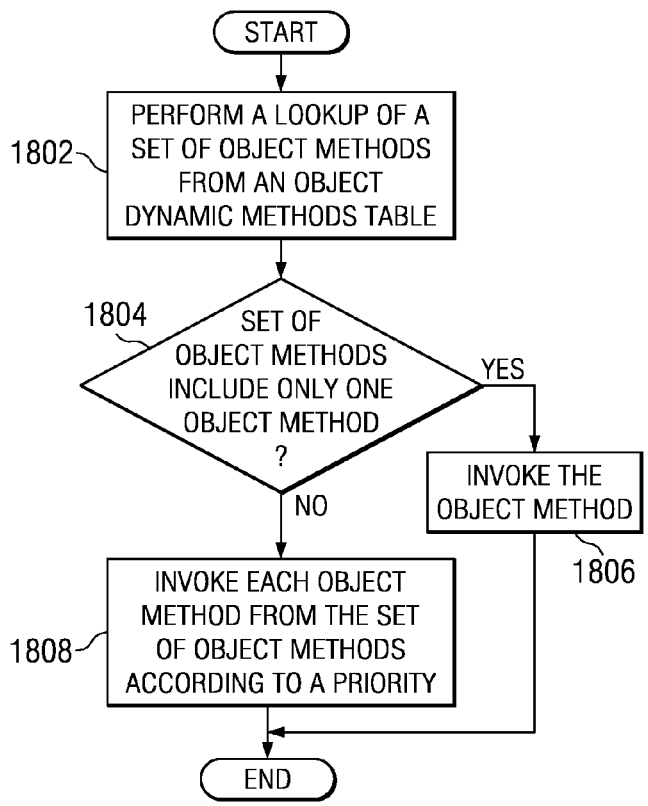
FIG. 18 is a process for invoking a set of object methods in accordance with an illustrative embodiment.

FIG. 18 is a process for invoking a set of object methods in accordance with an illustrative embodiment. The process in FIG. 18 may be implemented by software, such as clone controller 332 in FIG. 3.

The process begins by performing a lookup of the set of object methods from an object dynamic methods table (step 1802). The set of object methods may be found by correlating an ObjectMethodUUID field from the object clone control table with the object dynamic methods table. An example of the object clone control table is object clone control table 600 in FIG. 6. An example of the object dynamic methods table is object dynamic methods table 700 in FIG. 7.

The process then makes the determination as to whether the set of object methods includes more than one method objects (step 1804). If the process makes the determination that the set of object methods includes only one object method, then the process invokes the object method (step 1806) and terminates thereafter. However, if the process makes the determination that the set of object methods includes more than one object method, then the process invokes each object method from the set of object methods according to a priority (step 1808) and the process terminates.

Figure 19:
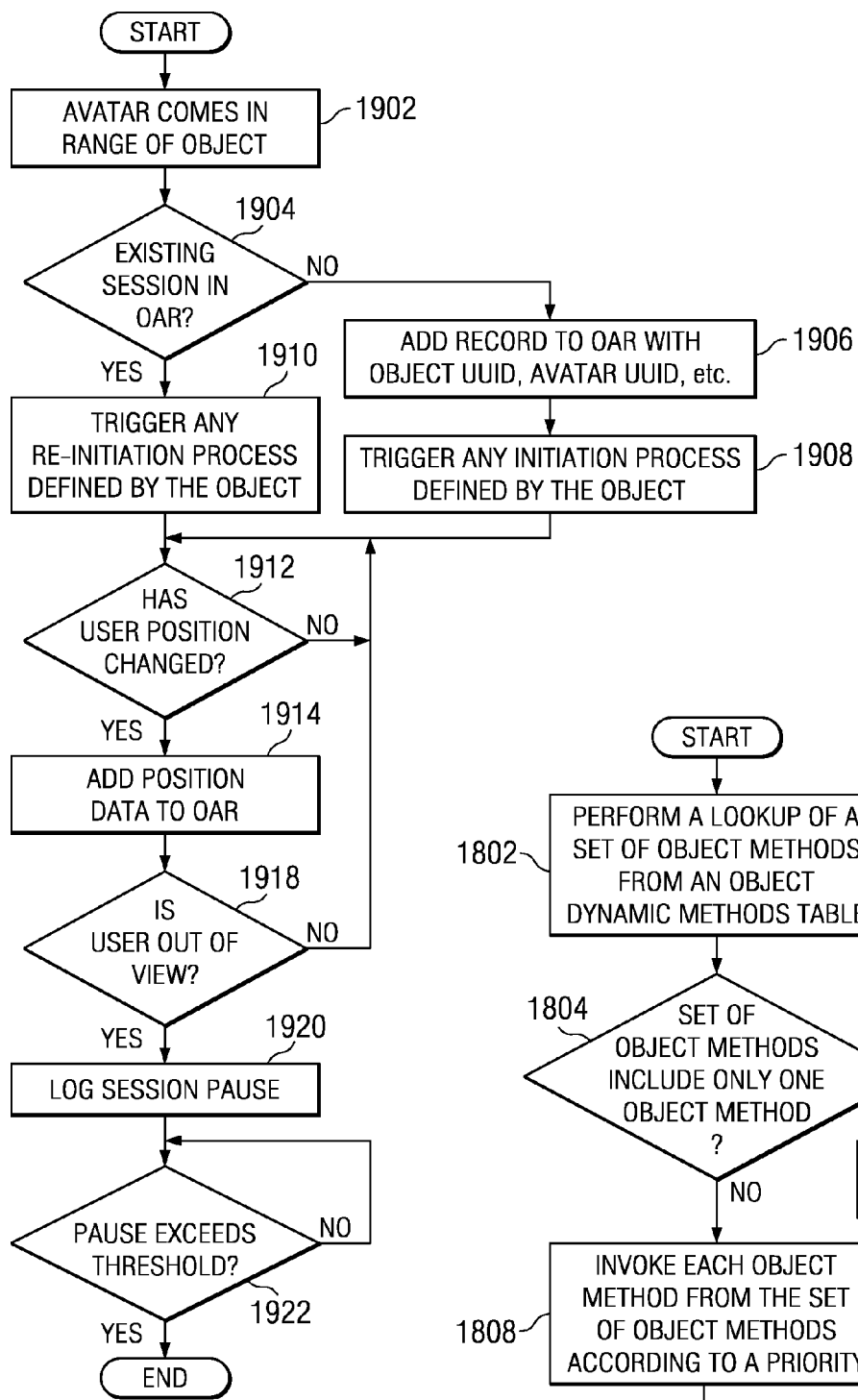
FIG. 19 is a flowchart of a process for identifying a location of an avatar in relation to a range of an object in accordance with an illustrative embodiment.

FIG. 19 is a flowchart of a process for identifying a location of an avatar in relation to a range of an object in accordance with an illustrative embodiment. The process in FIG. 19 is implemented by software for tracking avatars in a range of an object, such as object based avatar tracking controller 322 in FIG. 3.

The process begins when an avatar comes in range of the object (step 1902). A determination is made as to whether there is an existing session associated with the universally unique identifier of the object and the universally unique identifier of the avatar (step 1904). This step may be performed by making a query to the object avatar rendering table for the object. If there is not an existing session, the process creates a record in the object avatar rendering table with the universally unique identifier of the object and the universally unique identifier of the avatar (step 1906). The record in the object avatar rendering table may include other information, such as, without limitation, a date and time, which can be used for analysis, reporting, and billing purposes.

The process triggers any object initiation process defined by the object (step 1908). For example, if a user is viewing the object for the first time and the object has a video associated with viewing the object, the process starts playing the video from the beginning.

Returning to step 1904, if a session already exists, the process triggers any object re-initiation process defined by the object (step 1910). For example, if the user is not viewing an object with an associated video for the first time, the process starts playing the video at a point in the video after the beginning, such as after an introduction, in a middle part, or near the end of the video to avoid replaying introductory material.

The process makes a determination as to whether the user's position has changed (step 1912). Changing position may include traveling, turning, or disappearing, such as teleporting, logging off, or disconnecting. If the user's position has not changed, the process returns to step 1912. The process may return to step 1912 if the user's position does not change within a specified amount of time. The specified amount of time may be configured by the virtual universe grid administrator or object owner. The specified amount of time may occur very frequently, such as, without limitation, after a specified number of seconds or after a specified number of milliseconds.

When the user's position changes at step 1912, the process adds the user position data to the object avatar rendering table (step 1914). The user position data includes the angle of view coordinate data of the avatar relative to the object and distance of the avatar to the object. The process then performs an analysis of the position data and makes a determination as to whether the user is out of view (step 1918). The user may be out of view if the user or the user's avatar has disappeared or is no longer facing the object. If the user is not out of view, after a specified amount of time the process returns to step 1912. The specified amount of time may be configured by the virtual universe grid administrator or object owner. The specified amount of time may be, without limitation, a specified number of seconds or a specified number of milliseconds.

If the user is out of view at step 1918, the process logs a session pause (step 1920). The log may include the date and time. Next, the process makes a determination as to whether the session has been paused for an amount of time that exceeds a threshold amount of time (step 1922). The threshold amount of time may be configured by a virtual universe administrator. If the pause does not exceed the threshold, the process returns to step 1922. When the pause exceeds the threshold, the process terminates thereafter.

The process termination may include, without limitation, removing the records of the avatar from the object avatar rendering table. If the record is not deleted, when the avatar comes back into range of the object at step 1902, the process will make a determination at step 1904 that an existing session associated with the universally unique identifier of the object and the universally unique identifier of the avatar already exist.

Thus, the illustrative embodiments provide a computer implemented method, apparatus, and computer program product for modifying object colors in a virtual universe. In one embodiment, the process obtains avatar tracking data that identifies a location of an avatar in relation to a range of an object. The range includes a viewable field. The process then calculates modified pixel color values to form a modified color in response to detecting a condition for triggering modification of the object. Thereafter, the process modifies a color of the object to form the modified color when the location of the set of avatars is within the range of the object.

Rather than presenting an unchanging object to a user controlling an avatar in a virtual universe, users may be presented with objects that may be modified based upon a set of color constraints. Modifications to the object may make the object more visible. Consequently, the visibility of the object is improved thereby increasing the value of the object.

Further, clones of an object may be modified by altering the color of clones. Thus, the cloning of objects makes it possible to present a clone of an object to each avatar in the viewable area of the object to increase the visibility of the object. Cloning objects also increases the value of objects within a virtual universe because the visibility of these objects is improved.

In an illustrative embodiment, object color modifications may be implemented for each avatar in the range of the object. In this embodiment, clones of the object are generated for each avatar in the range of the object. The rendering of each clone is modified according to the particular circumstances of each avatar. Thus, an avatar donning equipment, such as sunglasses, which modifies the appearance of the clone may be presented with a clone whose coloring compensates for the modification. Likewise, another avatar located nearby but lacking sunglasses may be presented with a clone whose coloring compensates for the glare of nearby light sources.

In an alternate embodiment where cloning is not implemented, color modifications may be calculated as an average optimal rendering for a subset of visual conditions. Thus, for example, the effect of ambient conditions on an object may be determined and modified without regard to other visual conditions, such as the effect of obstructions or inventory items.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for modifying an object located in a virtual universe, the method comprising the steps of:
    a computer obtaining tracking data that identifies a location of a set of avatars in relation to a range of the object located in the virtual universe, wherein the range comprises:
        a first zone in which the set of avatars is able to see the object, the first zone having a first radial distance from a location of the object; and
        a second zone outside of the first zone and in which the set of avatars is not able to see the object, the second zone having a second radial distance from the location of the object;
    the computer, responsive to the set of avatars being within the second zone, and without user input, generating a clone of the object, located within the same virtual universe as the set of avatars, for each avatar in the set of avatars;
    the computer, responsive to detecting a condition for triggering a modification of a color of a particular clone of the object associated with a particular avatar in the set of avatars, calculating modified pixel color values for the particular clone of the object associated with the particular avatar in the set of avatars when the set of avatars is in the second zone to form a modified color;
    the computer brightening only the color of the particular clone of the object associated with the particular avatar in the set of avatars compared to an unmodified visual environment surrounding the particular clone of the object to increase visibility of the particular clone of the object to the modified color when the location of an avatar in the set of avatars is within the first zone, wherein the color of the particular clone of the object associated with the particular avatar in the set of avatars is modified according to conditions in the virtual universe associated with the particular avatar; and
    the computer applying the modified color to the particular clone of the object for a predetermined amount of time.

2. The method of claim 1, wherein the step of the computer obtaining the tracking data comprises the computer obtaining the tracking data from at least one of a computer program that manages information describing a location of an avatar in a virtual universe in relation to an object and a data structure storing one or more universally unique identifiers for objects and avatars within the first zone or a selected zone associated with the object.

3. The method of claim 1, wherein the condition is delta red, green, blue values exceeding predefined threshold red, green, blue values; and wherein the method further comprises the computer determining delta red, green, blue values of the object from original pixel color values of the object and comparing the original pixel color values with the modified pixel color values of the object.

4. The method of claim 1, wherein the step of the computer calculating the modified pixel color values further comprises:
the computer calculating modified red, green, blue values using a set of pixel color constraints that specify maximum red, green, blue values and minimum red, green, blue values for pixels of the object.

5. A computer program product for modifying an object located in a virtual universe, the computer program product comprising:
one or more computer readable tangible storage devices;
program instructions, stored on at least one of the one or more computer readable tangible storage devices, to obtain tracking data that identifies a location of a set of avatars in relation to a range of the object located in the virtual universe, wherein the range comprises:
a first zone in which the set of avatars is able to see the object, the first zone having a first radial distance from a location of the object; and
a second zone outside of the first zone and in which the set of avatars is not able to see the object, the second zone having a second radial distance from the location of the object;
program instructions, stored on at least one of the one or more computer readable tangible storage devices, to, without user input, generate a clone of the object, located within the same virtual universe as the set of avatar, for each avatar in the set of avatars in response to the set of avatars being within the second zone;
program instructions, stored on at least one of the one or more computer readable tangible storage devices, to calculate modified pixel color values when the set of avatars is in the second zone to form a modified color in response to detecting a condition for triggering a modification of a color of a particular clone of the object associated with a particular avatar in the set of avatars;
program instructions, stored on at least one of the one or more computer readable tangible storage devices, to brighten only the color of the particular clone of the object associated with the particular avatar in the set of avatars compared to an unmodified visual environment surrounding the clone of the object to increase visibility of the particular clone of the object to the modified color when the location of an avatar in the set of avatars is within the first zone, wherein the color of the particular clone of the object associated with the particular avatar in the set of avatars is modified according to conditions in the virtual universe associated with the particular avatar; and
program instructions, stored on at least one of the one or more computer readable tangible storage devices, to apply the modified color to the particular clone of the object for a predetermined amount of time.

6. The computer program product of claim 5, wherein the program instructions to obtain the tracking data obtain the tracking data from at least one of a computer program that manages information describing a location of an avatar in a virtual universe in relation to an object and a data structure storing one or more universally unique identifiers for objects and avatars within the first zone or a selected zone associated with the object.

7. The computer program product of claim 5, wherein the condition is delta red, green, blue values exceeding predefined threshold red, green, blue values, and wherein the computer program product further comprises:
program instructions, stored on at least one of the one or more computer readable tangible storage devices, to determine delta red, green, blue values of the object from original pixel color values of the object; and
program instructions, stored on at least one of the one or more computer readable tangible storage devices, to compare the original pixel color values with the modified pixel color values of the object.

8. The computer program product of claim 5, wherein the program instructions to calculate the modified pixel values-calculate modified red, green, blue values using a set of pixel color constraints that specify maximum red, green, blue values and minimum red, green, blue values for pixels of the object.

9. A computer system for modifying an object located in a virtual universe, the computer system comprising:
one or more processors, one or more computer readable memories and one or more computer readable tangible storage devices;
program instructions, stored on at least one of the one or more computer readable tangible storage devices for execution by at least one of the one or more processors via at least one of the one or more computer readable memories, to obtain tracking data that identifies a location of a set of avatars in relation to a range of the object located in the virtual universe, wherein the range comprises:
a first zone in which the set of avatars is able to see the object, the first zone having a first radial distance from a location of the object; and
a second zone outside of the first zone and in which the set of avatars is not able to see the object, the second zone having a second radial distance from the location of the object;
program instructions, stored on at least one of the one or more computer readable tangible storage devices for execution by at least one of the one or more processors via at least one of the one or more computer readable memories, to, without user input, generate a clone of the object, located within the same virtual universe as the set of avatars, for each avatar in the set of avatars in response to the set of avatars being within the second zone;
program instructions, stored on at least one of the one or more computer readable tangible storage devices for execution by at least one of the one or more processors via at least one of the one or more computer readable memories, to calculate modified pixel color values when the set of avatars is in the second zone to form a modified color in response to detecting a condition for triggering a modification of a color of a particular clone of the object associated with a particular avatar in the set of avatars;
program instructions, stored on at least one of the one or more computer readable tangible storage devices for execution by at least one of the one or more processors via at least one of the one or more computer readable memories, to brighten only the color of the particular clone of the object associated with the particular avatar in the set of avatars compared to an unmodified visual environment surrounding the clone of the object to increase visibility of the particular clone of the object to the modified color when the location of an avatar in the set of avatars is within the first zone, wherein the color of the particular clone of the object associated with the particular avatar in the set of avatars is modified according to conditions in the virtual universe associated with the particular avatar; and program instructions, stored on at least one of the one or more computer readable tangible storage devices for execution by at least one of the one or more processors via at least one of the one or more computer readable memories, to apply the modified color to the particular clone of the object for a predetermined amount of time.

10. The computer system of claim 9, wherein the program instructions to obtain the tracking data obtain the tracking data from at least one of a computer program that manages information describing a location of an avatar in a virtual universe in relation to an object and a data structure storing one or more universally unique identifiers for objects and avatars within the first zone or a selected zone associated with the object.

11. The computer system of claim 9, wherein the condition is delta red, green, blue values exceeding predefined threshold red, green, blue values, and wherein the computer system further comprises:

program instructions, stored on at least one of the one or more computer readable tangible storage devices for execution by at least one of the one or more processors via at least one of the one or more computer readable memories, to determine delta red, green, blue values of the object from original pixel color values of the object; and program instructions, stored on at least one of the one or more computer readable tangible storage devices for execution by at least one of the one or more processors via at least one of the one or more computer readable memories, to compare the original pixel color values with the modified pixel color values of the object.

12. The computer system of claim 9, wherein the program instructions to calculate the modified pixel values calculate modified red, green, blue values using a set of pixel color constraints that specify maximum red, green, blue values and minimum red, green, blue values for pixels of the object.

* * * * *